United States Patent [19]

Kondo et al.

[11] Patent Number: 5,130,985
[45] Date of Patent: Jul. 14, 1992

[54] SPEECH PACKET COMMUNICATION SYSTEM AND METHOD

[75] Inventors: Kazuhiro Kondo, Fuchu; Masashi Ohno, Kokubunji, both of Japan

[73] Assignee: Hitachi, Ltd., Tokyo, Japan

[21] Appl. No.: 439,805

[22] Filed: Nov. 21, 1989

[30] Foreign Application Priority Data

Nov. 25, 1988 [JP] Japan .............................. 63-295931
Feb. 22, 1989 [JP] Japan .............................. 1-040227

[51] Int. Cl.⁵ .............................. H04J 3/7; H04J 3/02; H04Q 11/04
[52] U.S. Cl. .............................. 370/94.1; 370/60; 370/85.6; 340/825.5; 340/825.51
[58] Field of Search .............. 370/94.1, 60, 60.1, 370/79, 85.6; 340/825.5, 825.51

[56] References Cited

U.S. PATENT DOCUMENTS 4,993,022  2/1991  Kondo et al. .............................. 370/79

OTHER PUBLICATIONS

Proc. Globecom '87 (1987) pp. 45.3.1–45.3.5, Han Ying Yin et al., Congestive Control for Packet Voice by Selective Packet Discerding.
IEEE Transaction on Comm vol. Com. 28, No. 7, Jul. 1980, pp. 1040–1046, Embodied DPCM for variable bit rate transmission, D. J. Goodman.
"Variable Rate Embedded ADPCM with Preceptually Appropriate Criteria", A-4, 1988, the Institute of Electronics, Inf. and Comm.
Overview of the ADPCM Coding Algorithm, Proc. Globe com '84, pp. 23.1.1–23.1.4, W. R. Daumer et al.

Primary Examiner—Douglas W. Olms
Assistant Examiner—Tenesghen Ghebretinsae
Attorney, Agent, or Firm—Antonelli, Terry, Stout & Kraus

[57] ABSTRACT

A speech packet communication system for making speech communication among a plurality of speech terminals and including a communication network. The communication network includes a transmission path and a plurality of intermediate switching nodes, each controlling the traffic of a plurality of speech packets received from the transmission path or other intermediate switching nodes in accordance with priority indicators contained in the respective packets. Each speech terminal converts the input speech signal to packets, transmits the packets onto the transmission path or decodes speech packets received from the transmission path. Particularly, when the terminal converts the input speech signal to packets, it uses a special purpose function of determining a priority indicator assigned to the packet to greatly improve the quality of a reproduced speech at a receiving end.

28 Claims, 26 Drawing Sheets

| SPEECH DETECTOR OUTPUT | | | PRIORITY | |
|---|---|---|---|---|
| | | | MOST SIGNIFICANT PACKET | LEAST SIGNIFICANT PACKET |
| SPEECH | HANGOVER REGION | | 5 | 6 |
| | FRONT-END REGION | | 5 | 6 |
| | SPEECH POWER LEVEL | LOW | 3 | 5 |
| | | MIDDLE | 2 | 4 |
| | | HIGH | 1 | 2 |
| SILENCE | | | 7 | 8 |

| SPEECH DETECTOR OUTPUT | | | PRIORITY | |
|---|---|---|---|---|
| | | | MOST SIGNIFICANT PACKET | LEAST SIGNIFICANT PACKET |
| SPEECH | HANG OVER REGION | | 6 | 7 |
| | FRONT-END REGION | | 6 | 7 |
| | SPEECH POWER LEVEL | LOW | 4 | 6 |
| | | MIDDLE | 3 | 5 |
| | | HIGH | 2 | 4 |
| SILENCE | | | 8 | 8 |

FIG. 27
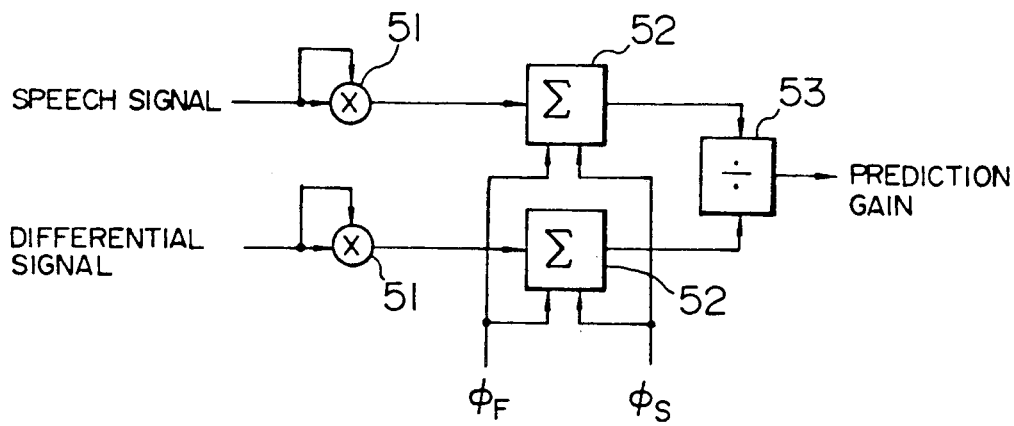
FIG. 28A
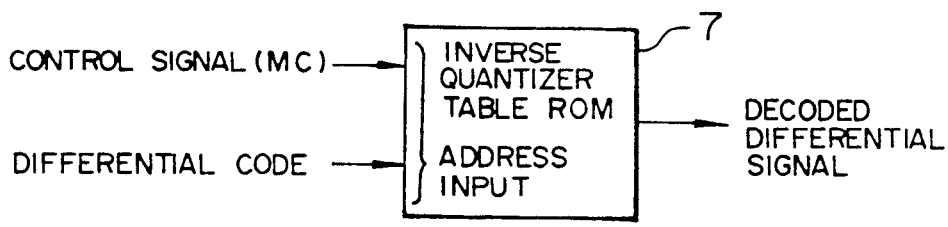
FIG. 28B
| ADDRESS INPUT | | OUTPUT (DECODED DIFFERENTIAL SIGNAL) |
|---|---|---|
| MC | DIFFERENTIAL CODE | |
| 0 | 1 | 10 |
| 0 | 0 | 10 |
| 0 | -1 | -10 |
| 0 | -2 | -10 |
| 1 | 1 | 10 |
| 1 | 0 | 2 |
| 1 | -1 | -2 |
| 1 | -2 | -10 |

FIG. 29A
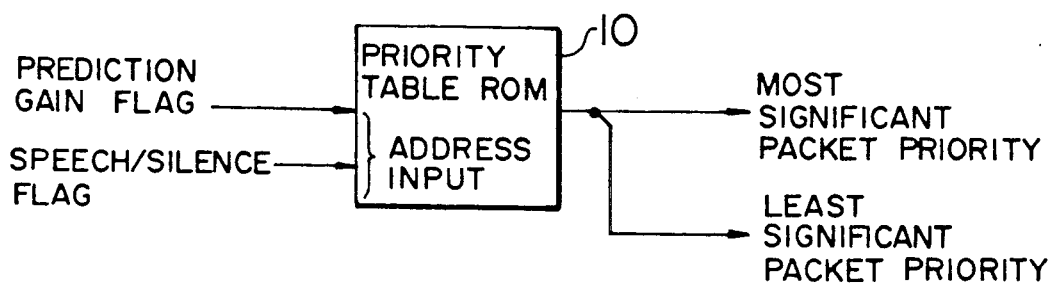
FIG. 29B
| ADDRESS INPUT | | PRIORITY LEVEL | |
|---|---|---|---|
| PREDICTION GAIN FLAG | SPEECH/ SILENCE FLAG | MOST SIGNIFICANT PACKET | LEAST SIGNIFICANT PACKET |
| 0 | 0 | 1 | — |
| | 1 | 0 | 1 |
| 1 | 0 | 0 | — |
| | 1 | 0 | 0 |
FIG. 30
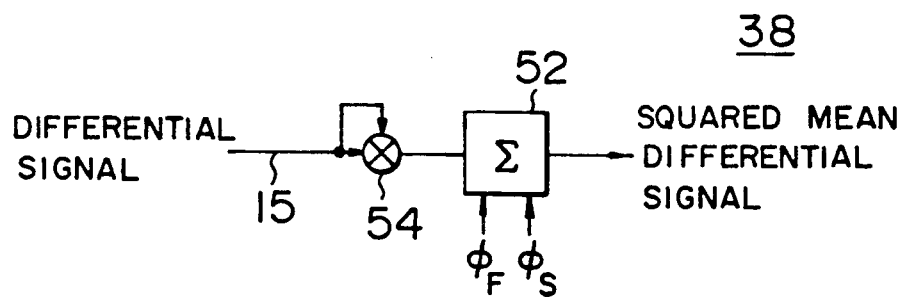

FIG. 34

| FLAG INPUT | | GENERATED PACKET | PRIORITY LEVEL |
|---|---|---|---|
| PREDICTION COEFFICIENT ADAPTATION MODE | SPEECH / SILENCE FLAG | | |
| 1 | 1 | FORMER HALF PACKET | 0 |
| 1 | 1 | LATTER HALF PACKET | 0 |
| 0 | 1 | MOST SIGNIFICANT PACKET | 0 |
| 0 | 1 | LEAST SIGNIFICANT PACKET | 1 |
| 0 | 0 | MOST SIGNIFICANT PACKET | 1 |

FIG. 35A

| | | 0 | 0 | 1 | $B_{11}$ | $B_{12}$ | $B_{13}$ | $B_{14}$ | ... | $B_{\frac{N}{2}1}$ | $B_{\frac{N}{2}2}$ | $B_{\frac{N}{2}3}$ | $B_{\frac{N}{2}4}$ |

30  31  33 34     FORMER/LATTER HALF INDICATOR(61)     35

FIG. 35B

| | | 1 | $B_{(\frac{N}{2}+1)1}$ | $B_{(\frac{N}{2}+1)2}$ | $B_{(\frac{N}{2}+1)3}$ | $B_{(\frac{N}{2}+1)4}$ | ... | $B_{N1}$ | $B_{N2}$ | $B_{N3}$ | $B_{N4}$ |

30  31  33 34     FORMER/LATTER HALF INDICATOR(61)     35

| CALL SEQUENCE NUMBER | PREDICTION GAIN THRESHOLDS (dB) |
|---|---|
| 1 | 1 |
| 2 | 5 |
| 3 | 10 |
| 4 | 20 |

SPEECH PACKET COMMUNICATION SYSTEM AND METHOD

BACKGROUND OF THE INVENTION

The present invention relates to speech packet communication systems for communicating encoded speech signals in the form of a packet, and more particularly to such systems in which a plurality of terminals are interconnected via a communication network in which each terminal prepares packets from encoded speech signals and communicates with each other using the packets.

In a conventional speech packet communication system, a transmitter (speech terminal) encodes an input speech signal detected at predetermined periods, uses the encoded speech signal and a code (for example, high, low, high ...) indicative of a priority determined at a predetermined rate to prepare the packets and transmits speech packets sequentially. A transmit node which has received the packets transmits a received packet of higher priority to a receiver if the communication state of the node is in a high traffic state.

Another conventional speech communication system is proposed in which the transmitter divides a coded speech signal detected during one sample time into the most significant bits indicative of an essential speech characteristic signal and the least significant bits indicative of an additive speech characteristic signal, prepares the most significant packet from a train of the most significant bits having a high priority, and the least significant packet from a train of the least significant bits having a low priority, contained in a predetermined time interval, and transmits the most and least significant packets. A transit node which has received these packets transmits to the receiver the packets sequentially, starting with a packet of higher priority if the communication state at the node indicates high traffic. These speech communication systems are described, for example, in Proc. Globecom '87 (1987) pp. 45.3.1–45.3.5.

Since, generally, the correlation between adjacent samples is high in a speech signal, it is recommended to linearly predict an input speech signal, to subtract the predicted value from the input signal, and to quantize differentials from which correlation between samples is greatly reduced rather than to directly quantize the input speech signal, because the former provides substantially the same speech quality using a smaller number of quantization bits than the latter. An encoding system employing this principle is referred to as Differential Pulse Code Modulation (hereinafter referred to as DPCM briefly).

Since the correlation between adjacent samples of a speech signal changes with phoneme, it is necessary to adapt a prediction coefficient, used in linear prediction, to the input speech. Generally, a predicted error or the magnitude of the differential is observed and the predicted coefficient is adapted such that the error is reduced. In the decoding end, the differential code or signal output from the transmitter is inversely quantized with a predetermined accuracy and a predicted value is calculated using the result and the output speech signal is obtained using the predicted value. Therefore, both the transmitter and the receiver and able to serve an encoding or decoding function on the basis of the same reference. In that case, even if the predicted coefficient itself is not actually transmitted, both the transmitter and the receiver can determine the same prediction coefficient to thereby use the transmitted capacity effectively. This system is referred to as a Backward Adaptive Differential Pulse Code Modulation (hereinafter referred to as ADPCM-b).

In a transit node in a communication network (for example, Asynchronous Transfer Mode (hereinafter referred to ATM)), part of a packet can be discarded in accordance with the traffic state. Discard of the packet is determined in accordance with a priority assigned to the packet. Such an operation of a transmit node is hereinafter referred to as traffic controlling. Thus, a first packet is prepared from the most significant bits of a train of bits of a speech signal inputted and encoded for a predetermined interval of time and greatly influencing on the speech quality, the packet is assigned high priority. A second packet is prepared from the least significant bits less influencing the speech quality whereby, the packet is assigned less priority. The resulting first and second packets are transmitted. Assigning such predetermined priorities to the respective packets serves to provide at least the most significant bits with high probability in the receiver even if a high traffic state occurs in the transmit node. If a prediction coefficient used in the ADPCM-b is calculated using only the most significant bits in both the transmitter and receiver, both the transmitter and the receiver will obtain the same prediction coefficient. Such encoding system is referred to as Embedded Adaptive Differential Pulse Code Modulation (hereinafter referred to as Embedded ADPCM briefly). The Embedded ADPCM includes a system which calculates the power value and prediction gain of a speech signal received at predetermined periods to change the number of bits of the input speech signal. The ADPCM is described, for example, in *AT & T Technical Journal*, Vol. 65, No. 5 (1986 September and October p. 12–22). The Embedded ADPCM is described, for example, in *IEEE Transactions On Communications*, Vol. COM-28, No. 7 (July, 1980) pp. 1040–1046, "Embedded DPCCM for Variable Bit Rate Transmission" or "Variable Rate Embedded ADPCM with Perceptionally Appropriate Criteria", *INSTITUTE OF ELECTRONIC AND COMMUNICATION ENGINEERS AUTUMN NATIONAL MEETING A-4.* 1988.

In the former conventional technique (Proc. Globecom), the transmitter beforehand determines priorities so as to be, for example, alternately high, low, high, low ..., prepares the packets sequentially from speech signals encoded for a predetermined time interval and the priorities and transmits the packets. Therefore, even if a transit node is in high traffic, the packets having at least alternate high priorities are transmitted, so that a speech signal reproduced by the receiver has a low probability that the speech signal will be absent continuously. Similarly, in the other speech communication systems, at least the most significant bits have a high probability that they will arrive at the receiver, so that a decoded speech signal has a low probability that it will be interrupted.

However, packets having excessively high priorities is used in order to cope with speech information present for a front end period of a talkspurt or a hangover in which the speech quality reproduced by the receiver is relatively less influenced. With speech information whose reproduced speech quality is deteriorated due to dropout of even a small packet, a slight deterioration in the decoded speech quality is inevitable except in the lowest traffic state of all the transit nodes through which the speech information passes to the receiver because a packet having low priority is discarded at a transit node with the same probability as the speech information present for the hangover interval.

In the latter conventional technique (for example, Embedded ADPMC), the prediction coefficient is calculated using only the most significant bits of the encoded speech signal or the accuracy of the differential code used for calculation of the prediction coefficient is lowered in accordance with the prediction gain.

Therefore, the prediction accuracy is deteriorated and the differential signal increases depending on the kind of the input speech. As a result, the error caused by quantizing the differential signal would increase and the signal to noise ratio of the reproduced speech signal would be lowered.

Especially, in the Embedded ADPCM which dynamically changes the number of coded bits of an input speech signal in accordance with the prediction gain of the input speech signal, the following problems would arise if, for example, an ATM (Asynchronous Transfer Mode) which would be a powerful candidate for the next generation communication networks is used as a communication network.

Generally, in the ATM network, a packet-like transmission unit is used which is called a cell of a fixed length. If a speech code in which the number of code bits in one period changes is stored, the number of packets transmitted during one period also changes dynamically. As a quantity of this change increases, a time interval will occur in which the number of packets produced temporarily increases and the transmission time for the packets increases the time interval. Thus it is necessary to prepare for an increased quantity of buffer memory to cause many produced packets to wait and see temporarily.

If the number of code bits in one period is not an integer times the length of a packet, one of the following two processes must be employed:

(1) The next frame period is awaited and the packet is filled with code bits for the next period and then transmitted; and (2) Bits indicative of an empty space (for example, of "0") are inserted into unused portions of the packet and the resulting packet is immediately transmitted.

According to the process (1), the time required for transmitting the code bits for one period would increase and the transmission times would vary. In the process (2), the efficiency of use of the transmission capacity would decrease.

SUMMARY OF THE INVENTION

It is therefore a first object of the present invention to provide a speech packet communication system in which a high reproduced speech quality is obtained in the receiver even if the communication circuit (transit node) is put in high traffic state.

It is a second object of the present invention to provide a speech packet communication system which limits the number of transmitted packets and decreases the traffic state of a transit node without deteriorating the reproduced speech quality at the receiver.

It is a third object of the present invention to provide a speech packet communication system which discriminates between the case where the input speech signal need to be encoded to a signal of high quality and the case where the input speech signal is permitted to be deteriorated slightly in quality, and which automatically selects an encoding system suitable for each of the cases.

In order to achieve the first object, in the inventive speech packet communication system, the transmitter (speech terminal) converts a speech signal input at a predetermined sample period (125 $\mu$sec) into an encoded speech signal of bits, prepares a first packet from the respective most significant bits of a plurality of such encoded speech signals obtained for a frame period (15 ms) and a second packet from the respective least significant bits, gives to the first and second packets priorities determined in accordance with the properties of the speech signals input during the frame interval and transmits the resulting packets.

Specifically, high priority is assigned to both the first packet of the most significant bits (the most significant packet) and the second packet of the least significant bits (least significant packet) in the speech signal portion which greatly influences the speech quality reproduced in the receiver. In a speech portion which less influences the reproduced speech quality due to a dropout of a packet (for example, for a hangover interval or a front-end interval), high priority is assigned to only the most significant packet while low priority is assigned to the less significant packet. Low priority is assigned to both of the most and least significant packets in a silent portion of the speech signal. Therefore, even if a transit node in a high traffic state discards a packet assigned low priority, a deterioration in a reproduced speech quality is minimized.

If an appropriate one of various priority levels is assigned corresponding to the level of a threshold for an input speech power, a higher reproduced speech quality is obtained in accordance with the degree of traffic of a transit node.

In order to achieve the second object, in the inventive speech packet communication system, the transmitter prepares and transmits only a packet having a priority higher than a predetermined level. Specifically, a transit node (an end switching node), directly connected to the transmitter which supervises the number of output packets from the transmitter, outputs a control signal to the transmitter in accordance with the traffic state of the transit node, and transmits only a packet which is assigned a predetermined high priority in accordance with the control signal. Therefore, a deterioration in a reproduced speech quality in the receiver is minimized to thereby reduce the traffic of the transit node.

A network control unit may be provided in the speech communication system to supervise the respective traffic states of a plurality of transit nodes to control the transmitter to thereby provide finer traffic control, instead of controlling the end switching node.

In order to achieve the third object, in the inventive speech packet communication system, the bit accuracy of a differential encoded value used for estimation of the prediction coefficient is changed in accordance with the nature of the input speech signal. One of a first mode in which a first transmission packet is prepared from the most significant bits of differential codes obtained in each frame period (for example, of about 15 ms) and a second transmission packet is prepared from the least significant bits of the differential codes, and a second mode in which a first transmission packet is prepared from the former half of one frame of differential codes obtained in each one frame and a second transmission packet is prepared from the latter half of the one frame is selected in accordance with the nature of the input speech signal.

According to the present invention, if the prediction accuracy of a prediction coefficient calculated without using the respective least significant bits of the encoded speech signal is greatly decreased, the application of the prediction coefficient of the frame is effected using the most and least significant bits. In addition, in the receiver, high priority is given to all the packets produced in the frame so as to provide both the most and least significant bits. Thus, a deterioration in the prediction accuracy is prevented and hence a deterioration in the quality of the speech signal obtained in the receiver is prevented.

The degree of a deterioration in the speech quality due to a degradation in the prediction accuracy can be larger than that in the speech quality due to the dropout of a packet for a short interval. In order to cope with such situation, a second mode is selected in which a first packet of both the most and least significant bits of the former half of the differential code bits obtained in each frame period and a second packet of the most and least significant bits of the latter half of the differential code bits are both assigned high priorities and transmitted. As a result, even if any one of the packets is discarded, the differential code which would otherwise be lost remains within half of the frame interval.

BRIEF DESCRIPTION OF THE DRAWINGS

The foregoing and other objects, advantages, manner of operation and novel features of the present invention will be understood from the following detailed description when read in conjunction with the accompanying drawings in which:

FIGS. 25A and 25B shows the structures of the most and least significant packets, respectively, obtained when the corresponding prediction coefficient adaption modes are "0"; FIGS. 25C and 25D show the structures of the most and least significant packets, respectively, obtained when the corresponding prediction coefficient adaptation modes are "1";

FIG. 27 is a block diagram of a prediction gain estimator in the transmitter in the sixth embodiment of the communication system;

FIG. 28A is a block of an inverse quantizer of a transmitter in the sixth embodiment of the communication system;

FIG. 28B illustrates the conversion characteristic of the inverse quantizer of FIG. 28A;

FIG. 29A is a block diagram of a priority assignment unit of the transmitter in the sixth embodiment of the communication system;

FIG. 29B illustrates the conversion characteristic of the priority assignment unit of FIG. 29B;

FIG. 30 is a block diagram of a differential signal squared mean estimator of a transmitter in a seventh embodiment of the communication system;

FIG. 34 illustrates the conversion characteristic of a priority assignment unit of a transmitter in a ninth embodiment of the communication system;

FIGS. 35A-35B each show the structure of a packet in the ninth embodiment wherein FIG. 35A shows the former half packet and FIG. 35B shows the latter half packet;

DESCRIPTION OF THE PREFERRED EMBODIMENTS

Figure 1:
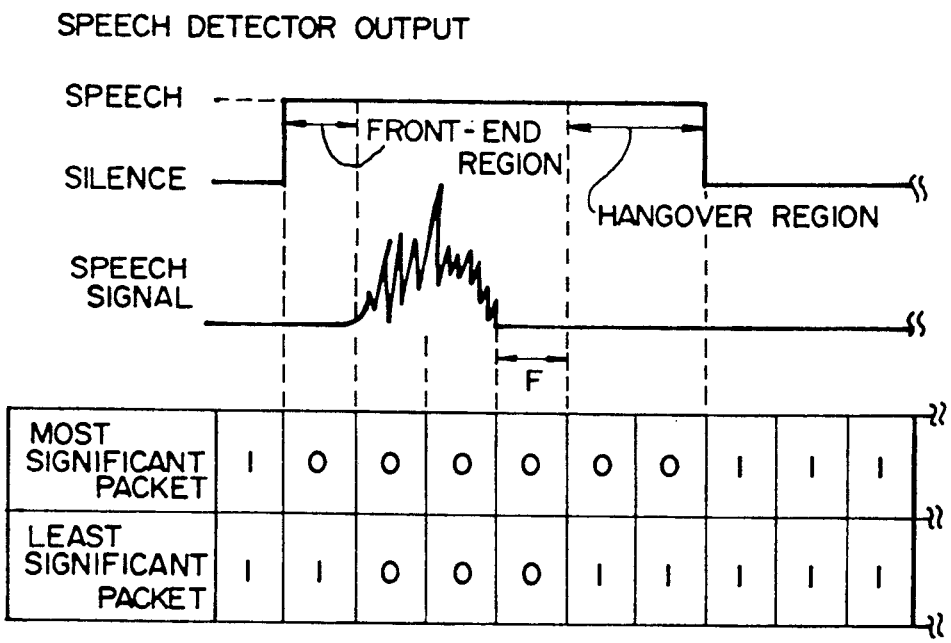
FIG. 1 illustrates the relationship between the speech signal input to a transmitter (speech terminal) of a speech communication system to which the present invention is applied and priorities of transmission packets.

FIG. 1 illustrates the relationship in correspondence between a speech signal inputted to a transmitter of a speech communication system to which the present invention is applied, and priority of a transmitted packet. A speech terminal (the transmitter) encodes an input speech signal at a predetermined sample period of 125 μsec, prepares a packet at a predetermined frame interval of about 15 msec and transmits the packet to a receiver. When a packet is to be prepared from an encoded speech signal, the encoded speech signal is divided into the most significant bits indicative of the characteristic portion of a voice in the speech signal and the least significant bits indicative of an auxiliary portion of the voice. The most and least significant bits are given respective bits indicative of predetermined priorities.

The transmitter has a function of determining that the input speech signal involves a speech if the signal exceeds a predetermined threshold level. Further, since the transmitter is capable of determining that one frame interval in which silence changed to a speech is a front-end region depending on a lapse of time and that two frame intervals after the speech input has disappeared is a hangover region, it determines priorities from these parameters (speech/silence, front-end, hangover) and the kinds of the packets (the most significant/least significant packets), as shown in FIG. 1. In this case, a priority of a smaller numeral ("0") means a higher priority.

Figure 2:
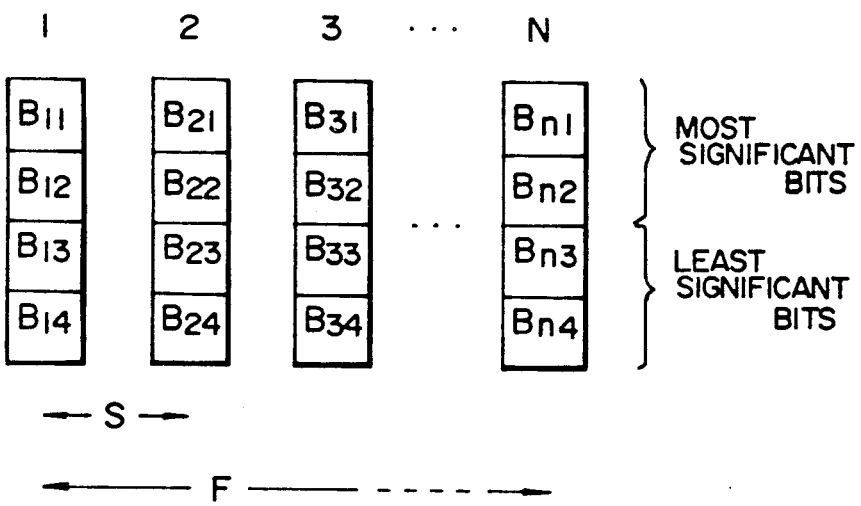
FIG. 2 schematically illustrates the conversion of an input speech signal to an encoded speech signal using an Embedded Coding Process.

FIG. 2 schematically illustrates the conversion of an input speech signal into an encoded speech signal using embedded coding. The input speech signal is converted to an encoded speech signal of 4 bits during a sample interval period S of 124 nsec. The above-mentioned most and least significant packets are prepared using as the most significant bits a train of bits ($B_{11}$, $B_{12}$, $B_{21}$, ... $B_{n1}$, $B_{n2}$) which is the characteristic portion of the speech signal in the coded speech signal for n samples (for example, n=125, one frame interval F=about 15 msec), and as the least significant bit a train of bits ($B_{13}$, $B_{14}$, $B_{23}$, ..., $B_{n3}$, $B_{n4}$) indicative of an auxiliary portion of the speech information.

Figure 3A:
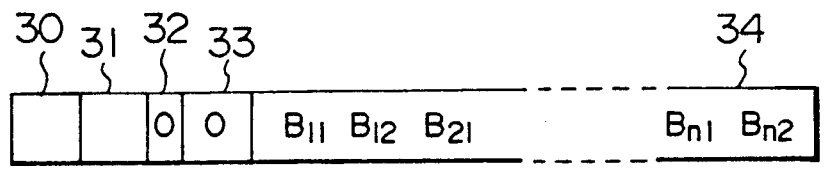
FIG. 3A shows the structure of the most significant packet.
Figure 3B:
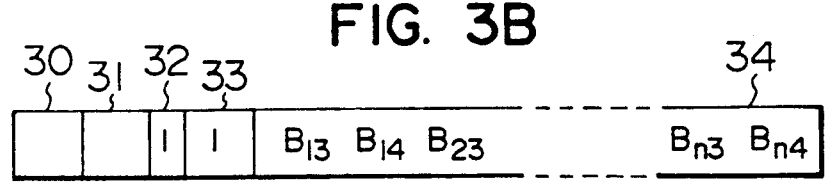
FIG. 3B shows the structure of the least significant packet.

FIGS. 3A-3B each show the structure of a packet in which the speech signal in the front-end region is stored in a set of most and least significant packets. Especially, FIG. 3A indicates the most significant packet and FIG. 3B the least significant packet. Each packet includes logical channel number indication bits 30 to store the addresses of transit nodes through which it passes to a target receiver, sequence number indication bits 31 for storing sequence numbers given sequentially to each packet, most/least significant indication bits 32 to discriminate the kind of a packet (between the most significant packet and least significant packet), priority bits 33 to store priorities, and speech information indication bits 34. The logical channel number indication bits 30 and the sequence number indication bits 31 are supplied by an end node to be described in more detail with reference to FIG. 7.

Figure 4:
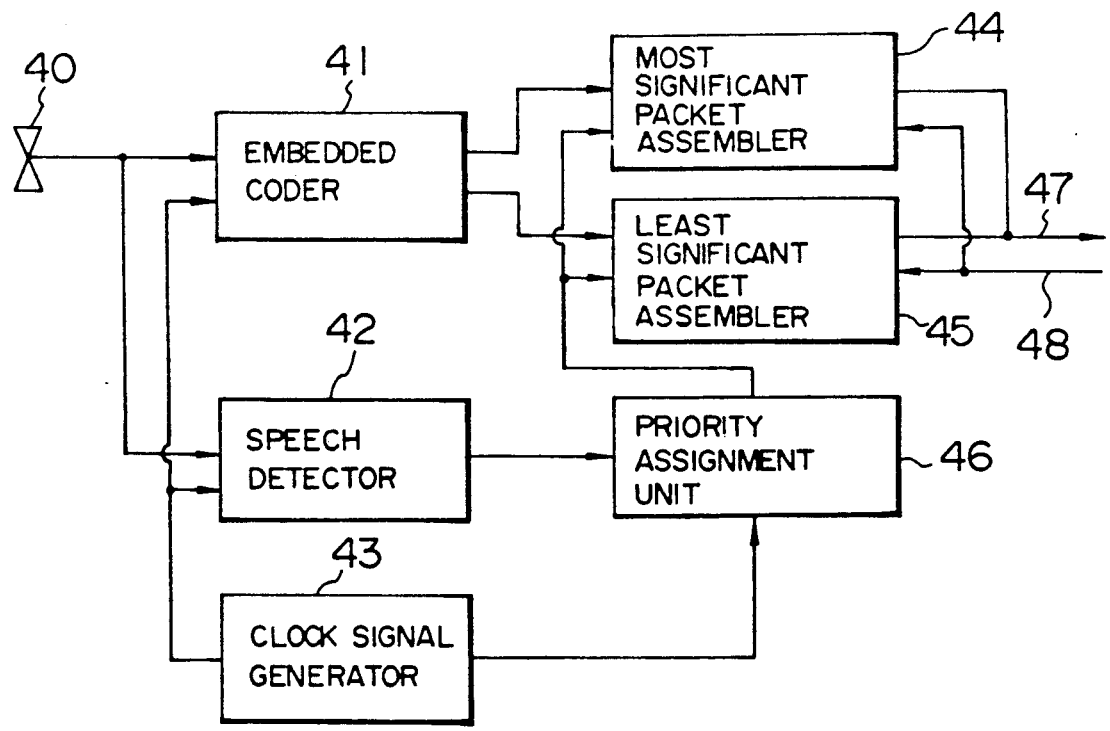
FIG. 4 is a block diagram of a transmitter (speech terminal) of the speech communication system to which the present invention is applied.

FIG. 4 is a block diagram of a transmitter (first embodiment) in the communication system according to the present invention. The transmitter includes an embedded coder 41 to encode the speech signal from a speech input 40, a speech detector 42 to detect parameters (speech/silence, front-end region, hangover region) of the input speech signal, a priority assignment unit 46 to determine the priority in accordance with parameter signals from the speech detector 42, a most-significant packet assembler 44 to store the encoded input speech signal in packets and store it in the receiver via a transmission line 47, and a least-significant packet assembler 45.

The embedded coder 41 encodes the input speech signal as mentioned above, and outputs a train of most-significant bits to most significant packet assembler 44 and a train of least-significant bits to least significant packet assembler 45 at each frame period. Speech detector 42 outputs a signal indicative of predetermined parameters (speech/silence, front-end region, hangover region) detected from the input speech signal to priority assignment unit 46 at each frame period. Priority assignment unit 46 determines a first priority to be assigned to the most significant packet and a second priority to be assigned to the least significant packet in accordance with a predetermined logic at each frame period and outputs these packets to the corresponding packet assemblers.

The most and least significant packet assemblers 44 and 45 prepare the packets from an encoded speech signal output from embedded encoder 41 and the priority determined by the priority assignment unit 46 and outputs the packets (FIGS. 3A-3B) to the receiver.

Figure 5:
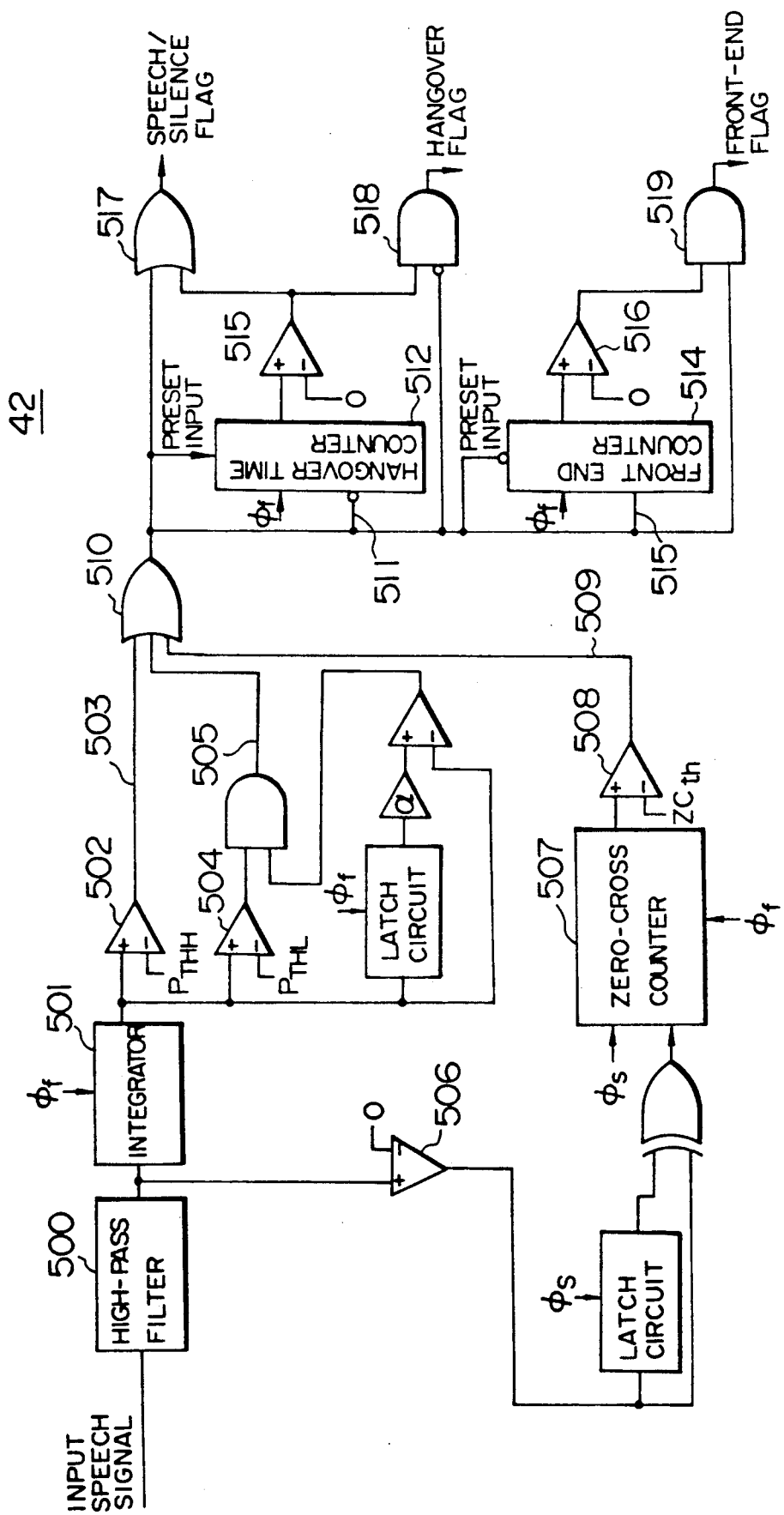
FIG. 5 is a block diagram of a speech detector of the transmitter of the speech communication system.

FIG. 5 is a block diagram of speech detector 42. High-pass filter 500 outputs the input speech signal to integrator 501 which outputs an integrated speech power at each frame clock period (one frame period). Comparator 502 outputs a first signal to output line 503 if the integrated value exceeds a high power threshold $P_{THH}$. Comparator 504 outputs a second signal to output line 505 if the integrated value exceeds a low power threshold $P_{THL}$ and exceeds the integrated value of the preceding frame by a factor of $\alpha$. High-pass filter 500 filters the input speech signal. Zero-cross counter 507 receives an exclusive OR of the output from comparator 506 and a signal obtained by latching the output from comparator 506 at a sample period.

Zero-cross counter 507 detects the output value at each sample period, and outputs its count for each frame to comparator 508, which outputs a third signal to output line 509 if the count exceeds a zero-cross threshold ZCth. Element 510 ORes the first to third signals to generate a fourth signal.

Hangover time counter 512 outputs a signal to comparator 515 a predetermined time interval (two frame periods) after the fourth signal disappears. Therefore, element 517 outputs a speech/silence flag for a time interval during which a speech signal is actually input and for the hangover interval. Element 518 outputs a hangover flag for the hangover interval.

Front-end counter 514 outputs a signal to comparator 516 a predetermined time interval (one frame interval) after a fourth signal is output. Thus, element 519 outputs a front-end flag during the front-end interval.

Figure 6:
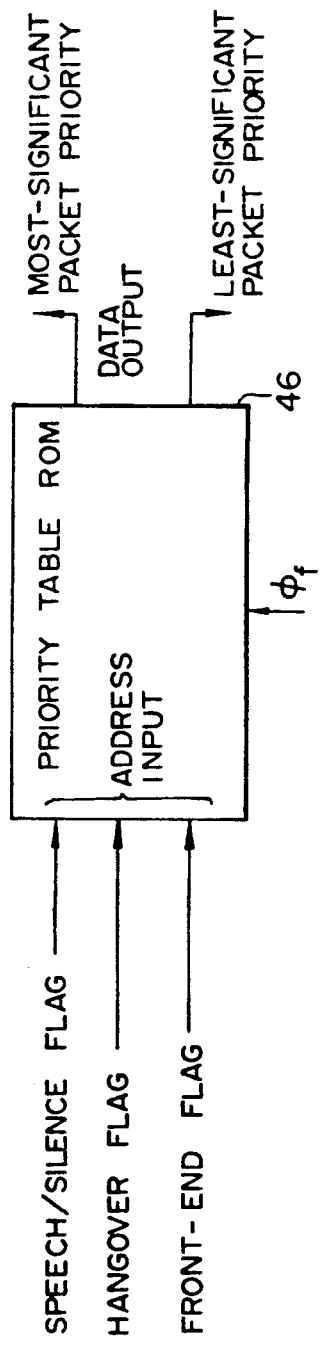
FIG. 6A illustrates the relationship between input and output of a priority assignment unit in the transmitter (speech terminal) of the speech communication system.
FIG. 6B illustrates a table indicative of the correspondence between speech detection output and priority.

FIG. 6A illustrates the function of priority assignment unit 46, which receives the three parameters (speech/silence flag, hangover flag, front-end flag) as its address input at each frame period and determines the priority in accordance with a predetermined logic. Priority assignment unit 46 further indicates a priority for the most significant packet to most-significant packet assembler 44 and a priority for the least significant packet to least-significant packet assembler 46 at each frame period.

FIG. 6B illustrates the logic of priority assignment unit 46 or a table indicative of the relationship in correspondence between speech detection output and priority. If the speech detection output involves a speech, the table gives the high priority "0" to the most-significant packet while the speech detection output involves silence, it gives the low priority "1". It assigns the high priority "0" to the least significant packet if the speech detection output involves a speech, and involves none of the hangover region and front-end region while if the speech detection signal involves silence, the hangover region and front-end region, it gives the low priority "1".

Figure 7:
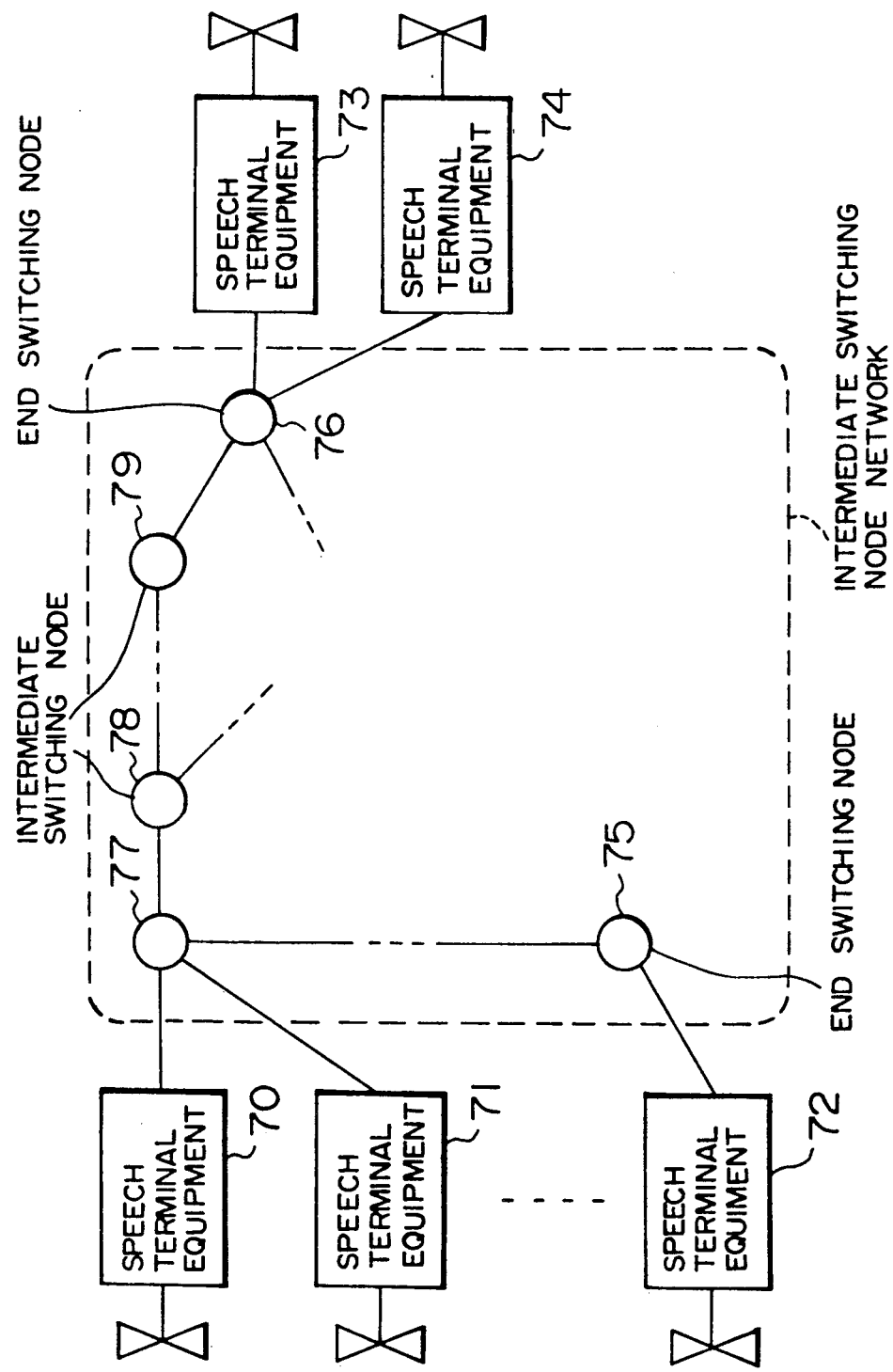
FIG. 7 is a block diagram of the inventive speech communication system.

FIG. 7 schematically illustrates the speech communication system to which the present invention is applied. A plurality of speech terminals (transmitters, for example, 70-72) are connected via an intermediate switching node network to other speech terminals (receivers, for example, 73, 74). The intermediate switching node network includes end switching nodes 75-77 connected directly to the speech terminals and other intermediate switching nodes 78, 79.

Figure 8:
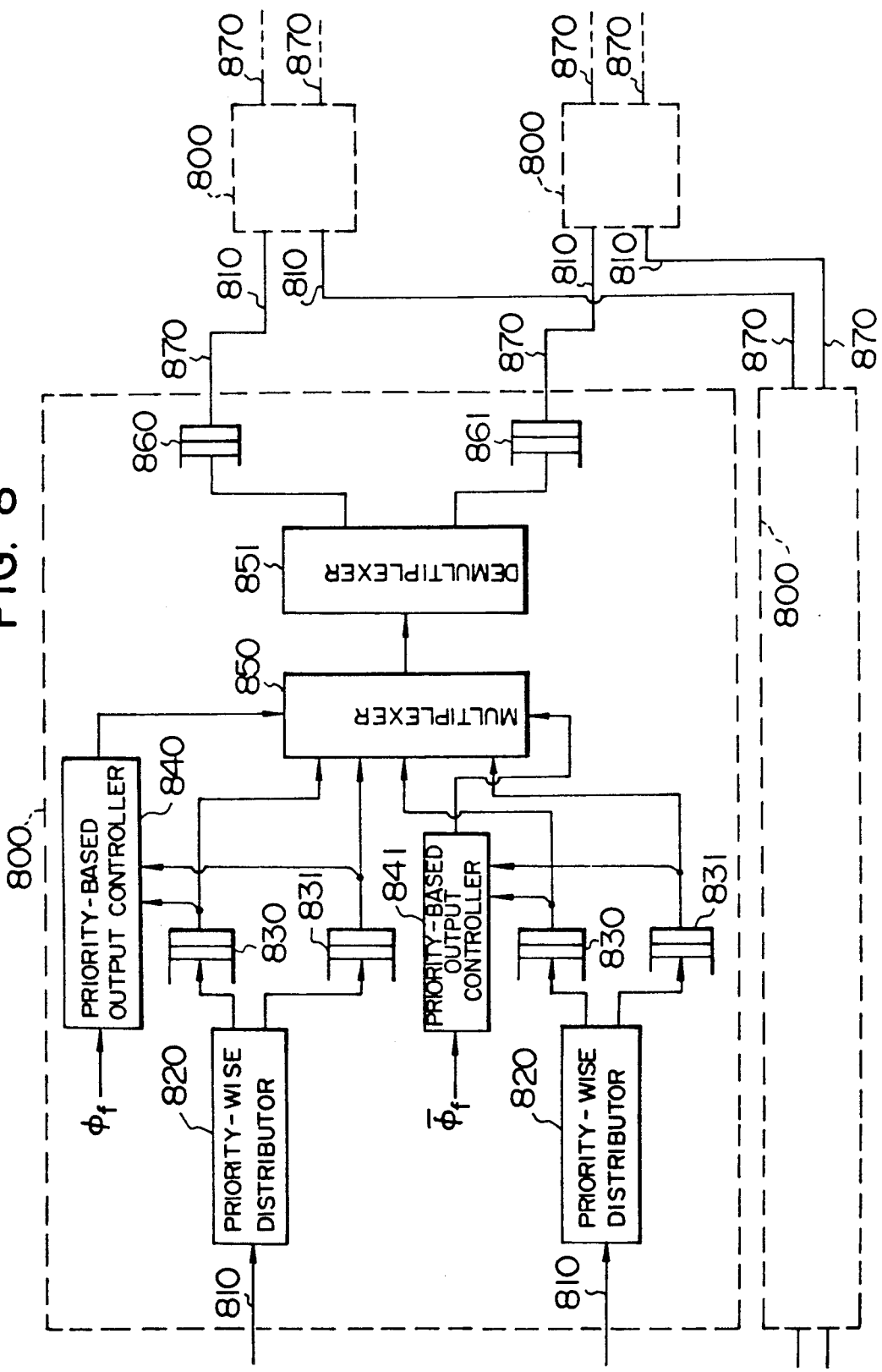
FIG. 8 is a schematic of a switch included in an intermediate switching node of the communication system.

FIG. 8 illustrates a switching arrangement included in the intermediate switching node (intermediate switching node or end switching node). The switching arrangement of the intermediate switching node includes a plurality of switch elements 800 connected in multi-stages. Priority-wise distributor 820 outputs a speech packet received at input port 810 to one of high priority buffer 830 and low priority buffer 831 in accordance with its priority. Priority-based output controllers 840, 841 supervise the respective numbers of packets stored in input buffers 830, 831, reads data for one packet sequentially in accordance with clock signals $\phi_f$, $\phi_f$ ($\phi_f$ and $\phi_f$ are the signals having the same period and which are ½ period out of phase with each other) from high priority buffers 830, and multiplexer 850 multiplexes and outputs the data to demultiplexer 851, which demultiplexes the multiplexed packet and distributes and stores the data in output buffers 860 and 861. Output buffers 860 and 861 output the stored packet data to output ports 870 packet by packet.

As mentioned above, the high priority packet is preferentially delivered irrespective of the presence of a packet of low priority in the buffer (input buffer 831) in the corresponding switch element. Namely, the high priority packet passes through an intermediate node network at higher speed compared to the low priority packet.

Figure 9:
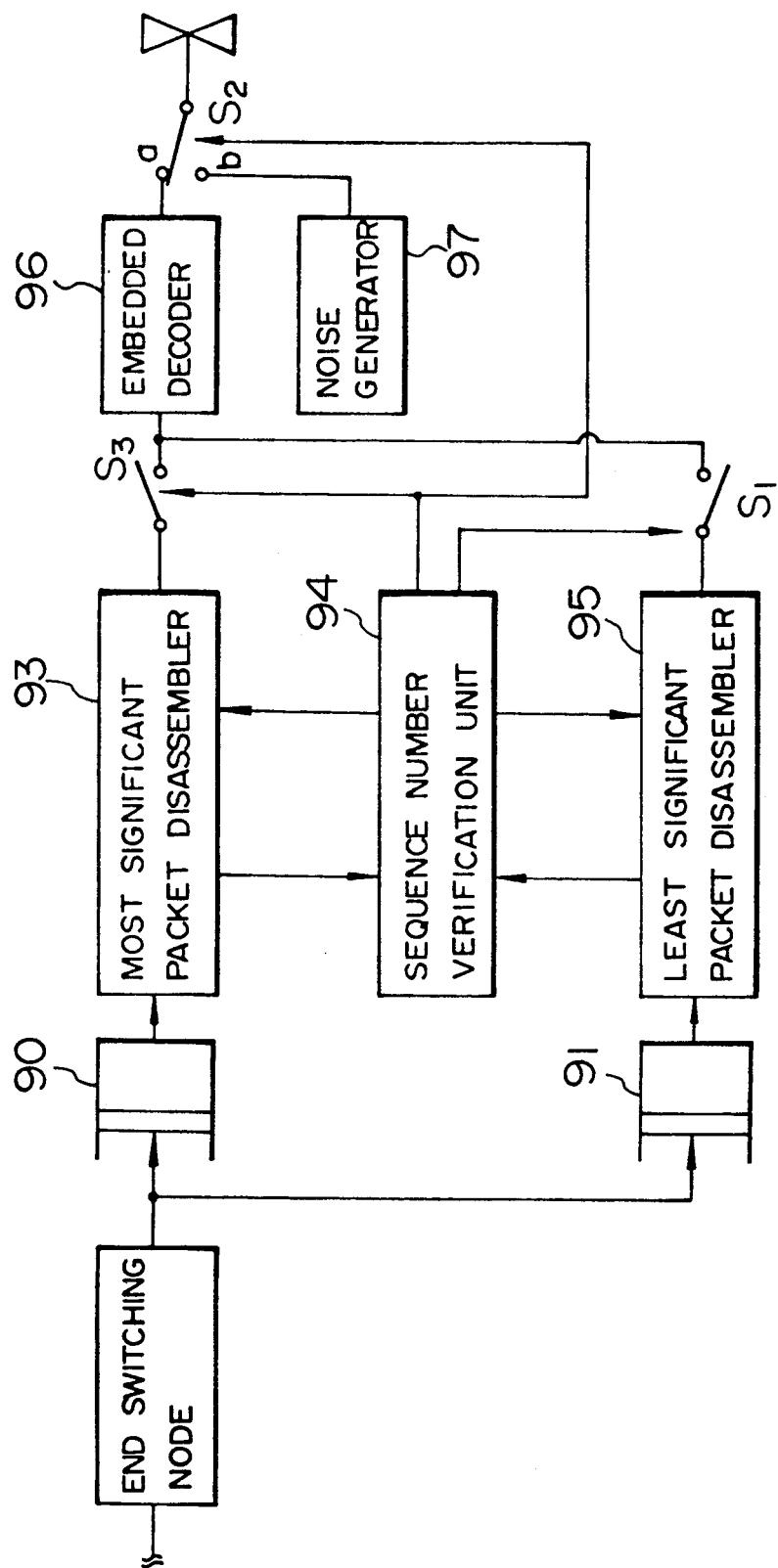
FIG. 9 is a block diagram of a receiver (speech terminal) of the communication system.

FIG. 9 is a block diagram of a receiver of the speech communication system to which the present invention is applied. A most-significant packet output by the end switching node is stored in most-significant packet buffer 90 while a least-significant packet is stored in least-significant packet buffer 91. The respective packet buffers feed packet by packet to packet disassemblers 93, 95, respectively, which extract and discard packet transmission priority 33, most-/least-significant packet designations 32 and logical channel number 30 which are unnecessary for decoding. Sequence number 31 is then extracted and output to sequence number verification unit 94, which checks whether the sequence numbers of the most and least significant packets are in serial order or not. If the sequence numerals of each of the most and least significant packets are in serial order, both switches $S_1$ and $S_3$ are closed and switch $S_2$ is switched to contact a. As a result, speech codes for one packet are read out from each of most- and least-significant packet disassemblers 93 and 95 and delivered to embedded decoder 96, which decodes speech codes from the input codes and delivers them to the hand set.

If only the sequence number 31 of the least significant packet is not in serial order, switch $S_1$ is opened, switch $S_2$ is switched to side a, and switch $S_3$ is closed. As a result, only the speech codes of the most significant packet are decoded and output by embedded decoder 96. If the sequence numbers in the most significant packet or in both of the most and least significant packets are not in serial order, switches $S_1$ and $S_3$ are both opened and switch $S_2$ is switched to side b. No speech codes are read out from the most and least significant packet disassemblers 93 and 95 and embedded decoder 96 does not operate. Instead, noise generator 97 outputs one packet length of noise simulating the speech signal.

A second embodiment will now be described in which the speech power is used in addition to the speech detection output when the transmitter determines priority.

Figure 10:
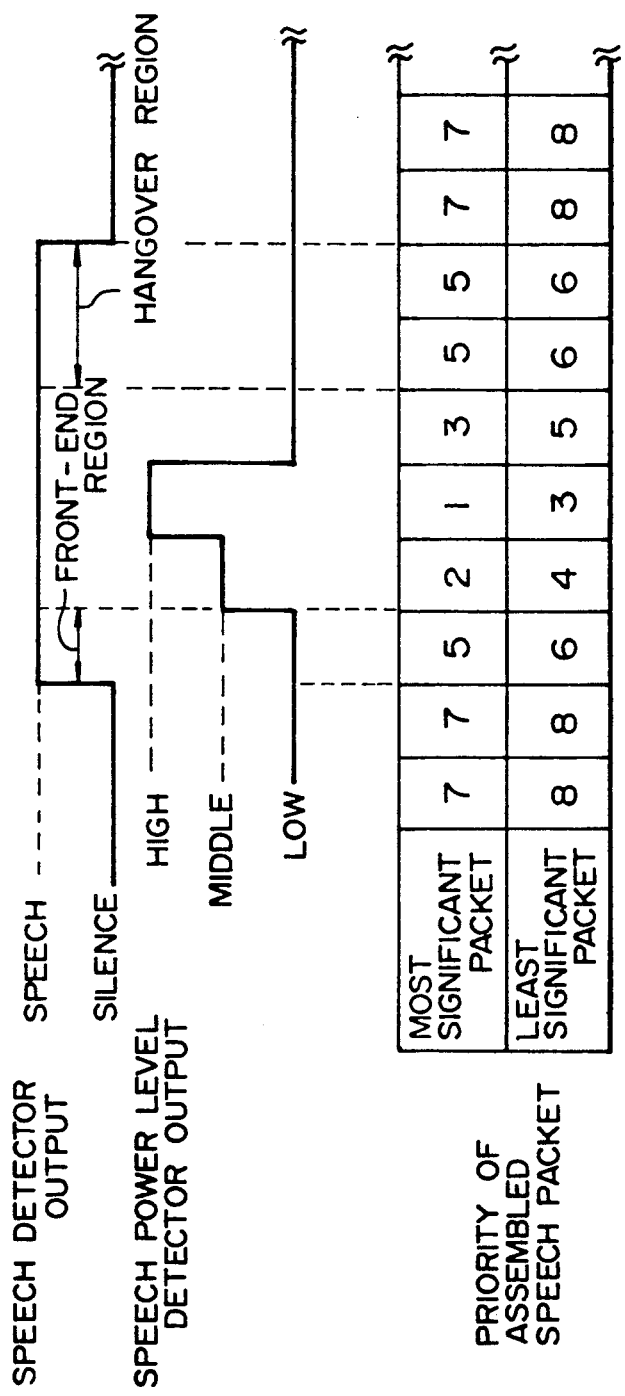
FIG. 10 illustrates the relationship between input signal (speech ditector output, speech power level) inputted to a transmitter of a second embodiment of the speech communication system and priorities of a communication packet.

FIG. 10 illustrates the relationship in correspondence among speech detection output, speech power level, priority of a transmitted packet. As shown in FIG. 10, in the second embodiment, priority is classified into eight levels, a region of the speech portion except for the front-end region and hangover region is given a higher priority as the speech power level is higher. In this case, the most significant packet is given a priority at least one level higher than the least significant packet generated during the same frame interval.

Figure 11:
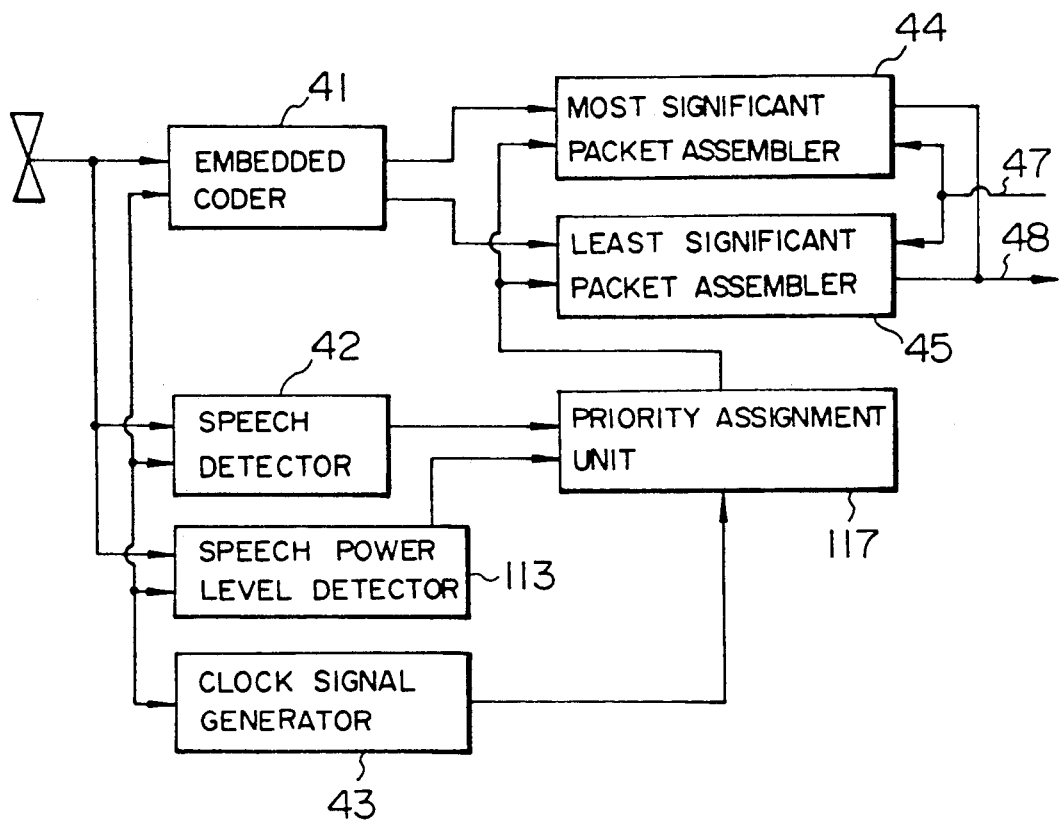
FIG. 11 is a block diagram of a transmitter as a second embodiment of the communication system.

FIG. 11 is a block diagram of the transmitter in the communication system of the second embodiment. Embedded encoder 41 and speech detector 42 are already described with reference to FIG. 4 and further description thereof will be omitted. The input speech signal is encoded by embedded encoder 41. The most significant bit of the encoded speech signal in a predetermined time interval is output to most significant packet assembler 44 and the least significant bit of the encoded speech signal is output to least significant packet assembler 45. Speech detector 42 outputs predetermined parameters to priority assignment unit 117. Speech power level detector 113 outputs three kinds of (high, intermediate, low) parameters to priority assignment unit 117 in accordance with speech power threshold level. Priority assignment unit 117 outputs a priority signal to most and least significant packet assemblers 44 and 45 in accordance with a predetermined logic.

Figure 12:
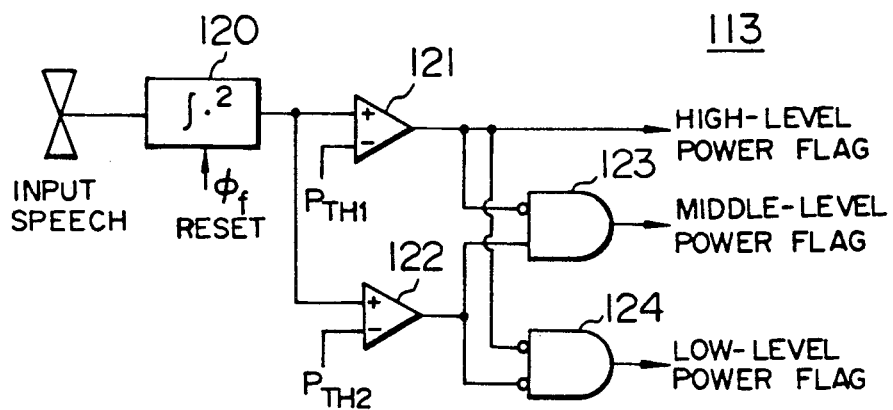
FIG. 12 is a block diagram of a speech power level detector in the transmitter of the second embodiment.

FIG. 12 is a block diagram of speech power level detector 113. Integrator 120 integrates the input speech signal for one frame period (F) and outputs the integrated value $P_{av}$ to comparators 121 and 122. The input speech power $P_{av}$ is calculated by the following equation:

$$P_{av} = \frac{1}{F} \sum_{i=1}^{F} X_i^2$$

where $X_i$ is the input speech sampled value at time i. When $P_{av}$ is larger than $P_{th1}$, comparator 121 outputs a first signal while if $P_{av}$ is larger than $P_{th2}$, comparator 122 outputs a second signal.

Therefore, speech power level detector 113 outputs a high-level power flag if the first signal is output while it outputs a middle level power flag if only a second signal is output. If none of the first and second signals is output, a low-level power flag is output. It is assumed that $P_{th1} > P_{th2}$.

Figures 13A, 13B:
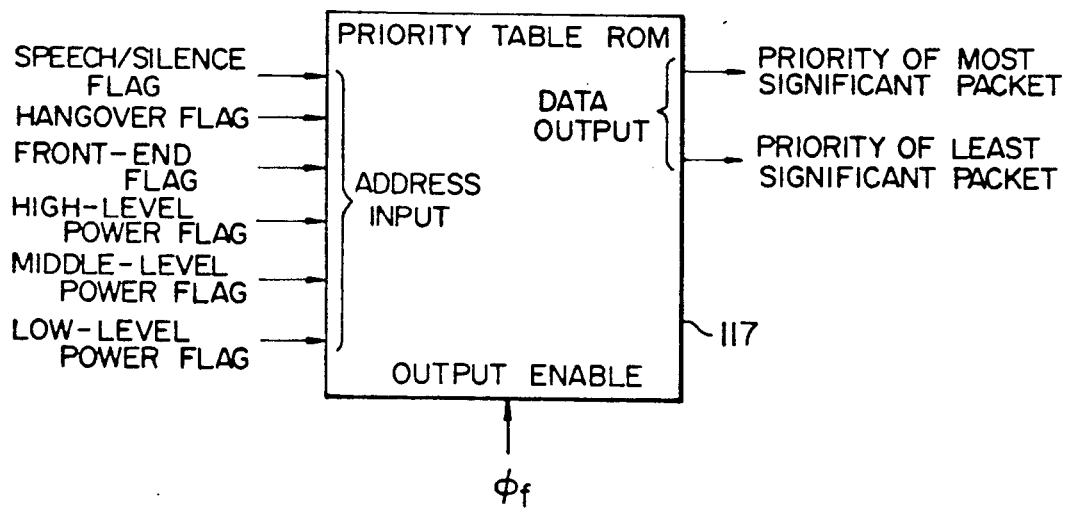
FIG. 13A illustrates the relationship between input and output of a priority assignment unit of the transmitter of the second embodiment.
FIG. 13B illustrates a table indicative of the relationship among speech detection output, speech power level and priorities of transmitted packets.

FIG. 13A illustrates the function of priority assignment unit 117. As shown, input as the address input values are speech power levels such as a speech/silence flag and a hangover flag. Priority assignment unit 117 determines a predetermined priority in one frame period ($\phi_f$) and outputs priority signals to the most and least significant packet assemblers 44 and 45.

FIG. 13B illustrates the relationship in correspondence among speech detector output, speech power level and priority of priority assignment unit 117.

In the second embodiment, the number of input buffers of the switch elements of the transit node described with reference to FIG. 8 should be equal to the number of priority levels (8).

Figure 14:
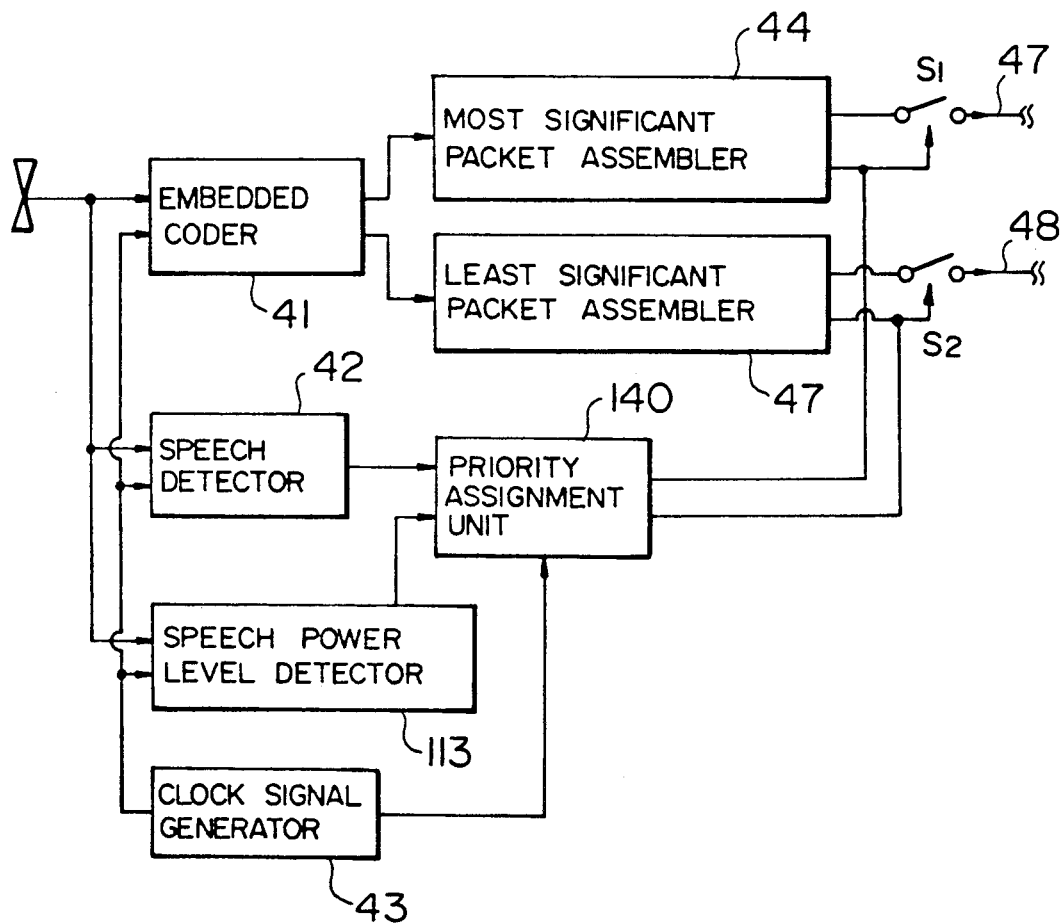
FIG. 14 is a block diagram of a transmitter in a third embodiment of the speech communication system.

FIG. 14 is a block diagram of a transmitter of a third embodiment. The operation and structure of the transmitter are substantially the same as those of that in FIG. 11 and further description thereof will be omitted. The main difference between FIGS. 14 and 11 is the provision of output switches at the outputs of the packet assemblers. The switches are closed only, when a packet having a priority higher than a predetermined level is output from the priority assignment unit. If otherwise, no packets are output.

Figure 15:
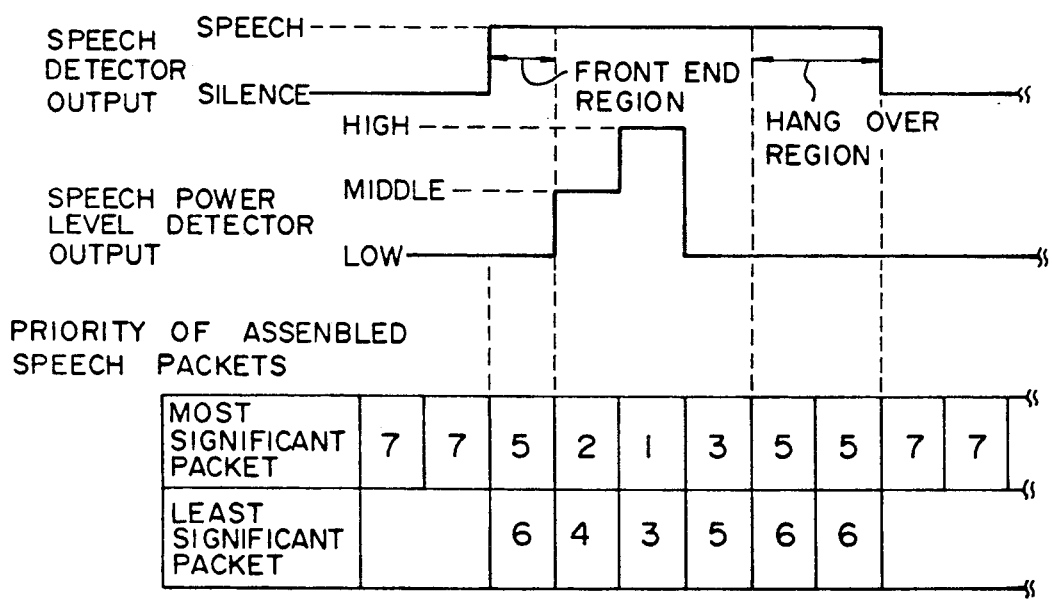
FIG. 15 illustrates the relationship between speech signal inputted to the transmitter in the third embodiment and determined priorities.

FIG. 15 illustrates the relationship in correspondence between input speech and priority in the third embodiment where the least significant packet of a silent portion is not transmitted, so that high speed transmission is effected and high traffic at transit nodes is avoided.

Figure 16:
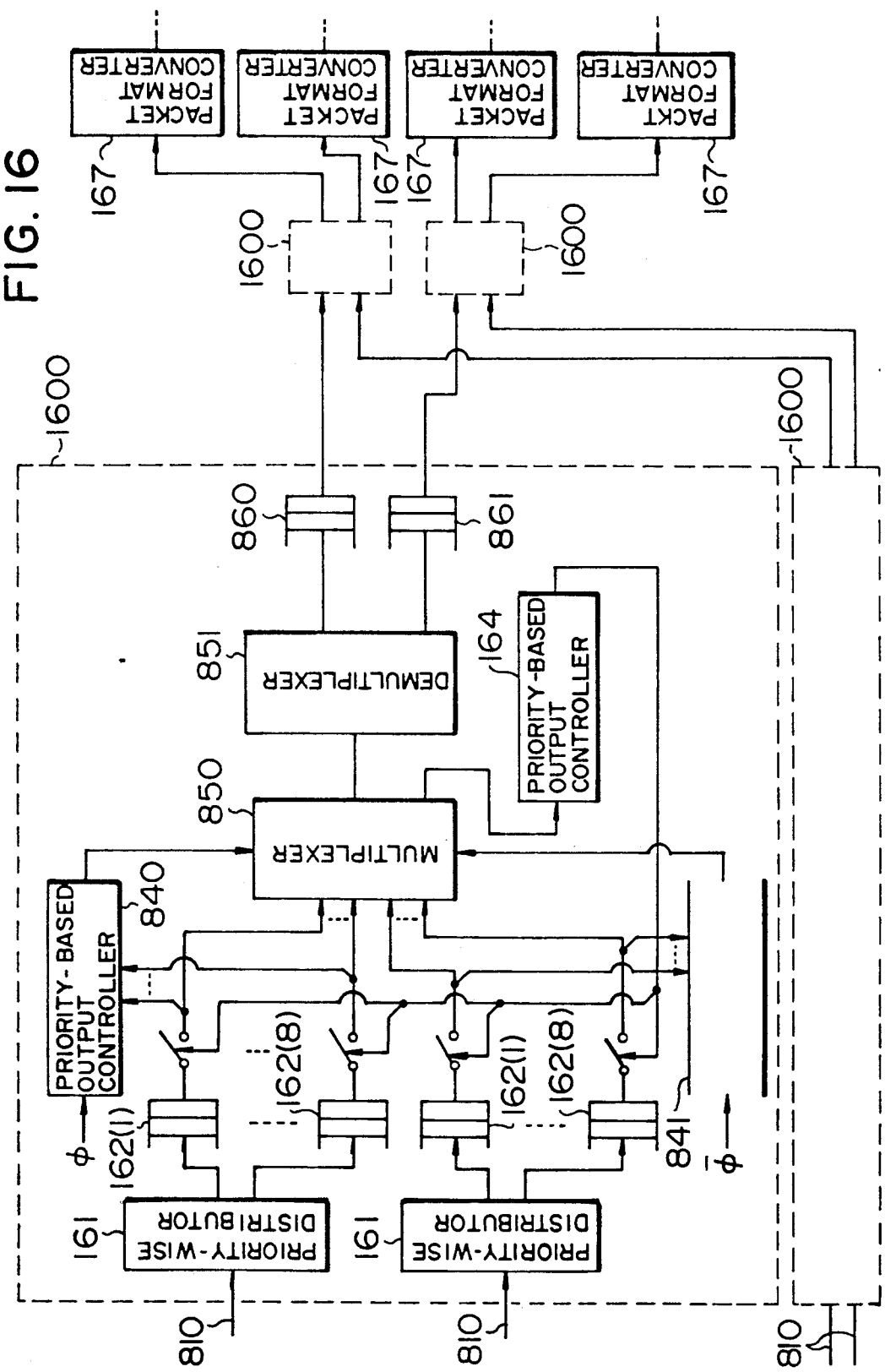
FIG. 16 is a block diagram of a transit node (end switching node) of the communication system to which the present invention is applied.

FIG. 16 is a block diagram of an end switching node where a priority-based output controller is provided in the end switching node of the intermediate node network to limit the number of output packets in accordance with the traffic state of the node. Priority-wise distributor 161 distributes speech packets received at input port 810 to priority-wise input buffers 162(n) where n is 1 – 8. High priority packets are read out from the respective buffers as in the embodiment of FIG. 8 and multiplexed by multiplexer 850 on a time divisional basis. Multiplexer 850 supervises the number of multiplexed packets and delivers it to priority-based output controller 164, which when the number of multiplexed packets exceeds a determined value, opens switches, connected to the outputs of respective input packet buffers 162(n), sequentially in low priority order in accordance with the number of output packets to thereby accommodate the number of packets, to be multiplexed next, in a predetermined value.

Demultiplexer 851 outputs packets, multiplexed and output by multiplexer 850, to output buffer 860 or 861 in accordance with output port.

Figure 17:
FIG. 17 shows the structure of a packet output from a packet format converter of the communication system.
Figure 18:
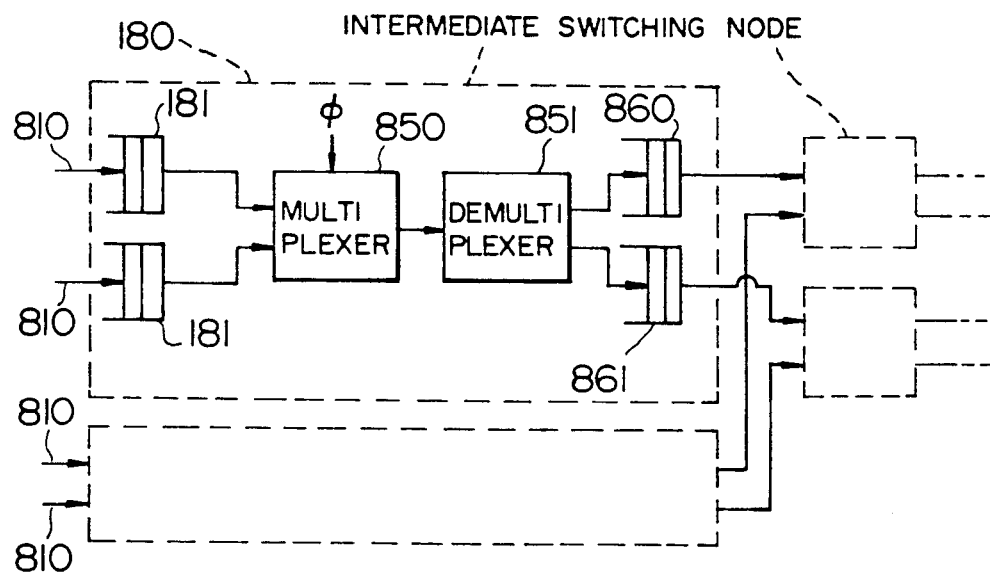
FIG. 18 is a block diagram of a transmit node (intermediate switching node) switch of the communication system.

As mentioned above, a packet having passed through all the switch elements in the end switching node is input to packet format converter 167 before it is sent by the end switching node. Packet format converter 167 deletes a bit indicative of the priority from the input packet and outputs the resulting packet. FIG. 17 illustrates the structure of the output packet in which the bit indicative of its priority is deleted. The packet includes logical channel number 30 as its head element, sequence number 31, most-/least-significant indicative bit 32 and speech information 34 in this order. The packet output from the end switching node arrives at the speech terminal of the partner through a plurality of intermediate switching nodes and the end switching node of the partner. In this case, no packets are discarded according to priority at the intermediate switching nodes. FIG. 18 is a block diagram of each of the switches of the intermediate switching node 180 subsequent to the end switching node.

As mentioned above, if the end switching node of FIG. 16 is used, the packets input to the respective switching nodes are not given priorities. Therefore, the packets input to the respective input ports 810 are input to corresponding input packet buffers 181. As described with reference to the switching node of FIG. 8, the respective packets are output to output buffers 860, 861 corresponding to logical channels via multiplexer 850 and demultiplexer 851. In this way, the respective packets switched and transmitted are decoded by a receiving section of the speech terminal of FIG. 9.

According to the intermediate switching nodes of FIGS. 8 and 16, the dropout of high priority packets is reduced in degree compared to low priority packets in the end switching node and a quantity of deterioration in a packet due to its dropout is reduced. By limiting the number of output packets in the end switching node, the probability of occurrence of overload in the network is reduced. Since no priority control is provided in the switching nodes except in the end switching node, switching processing is simplified and a quantity of hardware such as the input buffers is reduced, but using the intermediate switching node of FIG. 18 additionally.

The switch arrangement of FIG. 16 except for packet format converter 167 may be used for the whole switching node. In this case, the number of output packets can be limited in the whole switching node to thereby permit flexible traffic control substantially without deteriorating the speech quality.

It is possible to limit the number of packets in the speech terminal as in the second embodiment, using the number of packets supervised by the end switching node.

It is also possible to control the number of packets in accordance with the information fed by the network control unit which supervises the number of packets of each of the nodes in the network without limiting the number of packets using only the number of packets of each of the switching nodes.

Figure 19:
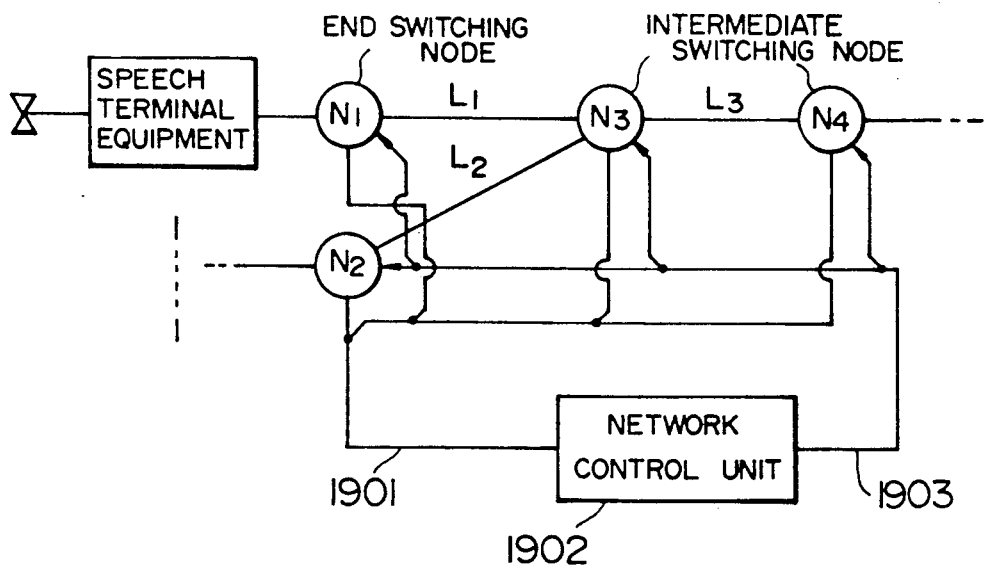
FIG. 19 is a schematic of a system to which the present invention is applied and which includes a network control unit to supervise the traffic state of a transit node.

The system structure using this network control unit will be described with reference to FIG. 19. A signal indicative of the number of packets output from each switching node is delivered to network control unit 1902 via a communication line 1901. Network control unit 1902 determines a link where overload occurs due to the above signal and delivers control information, to limit the number of packets flowing into the link, via communication line 1903 to respective nodes $N_1$, $N_2$, $N_3$, $N_4$.

Assume now that overload occurs at link $L_3$. The network control unit limits the number of packets generated from node $N_3$ by suppressing the transmission of packets of low priorities and limits the number of output packets from nodes $N_1$, $N_2$ connected via links $L_1$, $L_2$ to node $N_3$ to thereby avoid overload.

According to the particular embodiment, flexible optimal traffic control is provided depending on the load state of the whole network by minimizing a deterioration in the speech quality.

Figures 20, 21:
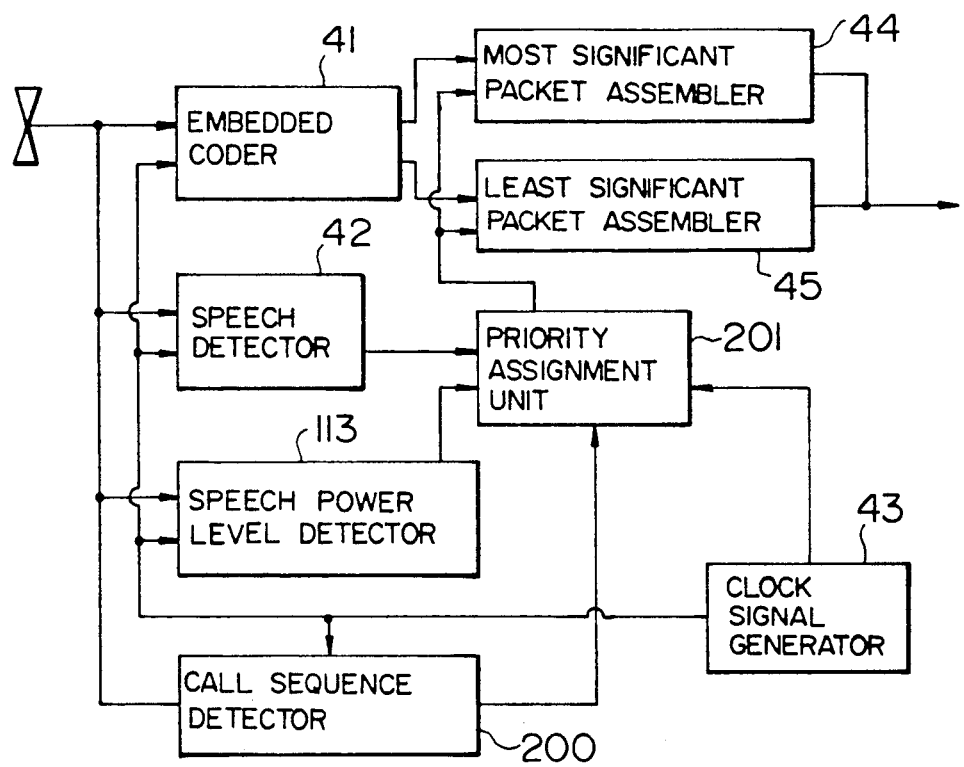
FIG. 20 is a block diagram of a transmitter as a fourth embodiment of the communication system.
FIG. 21 illustrates the relationship in correspondence between input speech signal and priority obtained when sequence numbers are used to determine a priority.

A fourth embodiment of the present invention will now be described. FIG. 20 is a block diagram of a transmitter of a speech terminal in the particular embodiment. The rough operation of the transmitter is similar to that of the second embodiment of FIG. 11 and further description thereof will be omitted.

The input speech signal is input to call sequence detector 200 which detects a call sequence determined beforehand when a call is set and delivers the result of the detection to priority assignment unit 201.

If no specific sequence is detected, priority assignment unit 201 assigns priorities to the respective most and least significant packets in accordance with the correspondence relationship of FIG. 21. If the specific sequence is detected, unit 201 assigns a priority in accordance with the correspondence relationship shown in FIG. 13B. In this way, the speech packets assigned priorities are switched, transmitted and decoded in a manner similar to that of the first embodiment.

As will be seen from the comparison of FIGS. 13B and FIG. 21, if there is a specific call sequence input, a speech signal has a higher priority compared to a speech signal of the same kind when there is no specific call sequence. Namely, if a specific call sequence is input, a transmission is provided where the number of dropout packets is less than otherwise, and, as a result, speech communication of generally higher quality is provided.

As described above, according to the particular embodiment, a specific call sequence depending on application is input to provide speech communication of higher quality. For example, in an intra-office communication, economical communication is provided by inputting no call sequence. While in the particular embodiment an example of using a specific call sequence has been illustrated, a subscriber number which provides a speech communication of high quality is discriminated from a subscriber number which provides an economical speech communication by selecting a correspondence relationship of priority shown in FIG. 13B or FIG. 21 depending on the subscriber number of a speech terminal.

Similar effects may also be produced by providing the call sequence detection and priority-based control of a speech packet in the end switching node.

While in the first to fourth embodiments the arrangements have been described in which the input speech signal is divided into the most and least significant bits in encoding, the division of the encoded speech signal into two is not the essential requirements of the present invention and may be divided into any number of parts. In this case, it is possible to more flexibly weight the speech signal compared to the first embodiment even if the same priorities, for example, of 1 and 0, as those used in the first embodiment are used.

Figure 22:
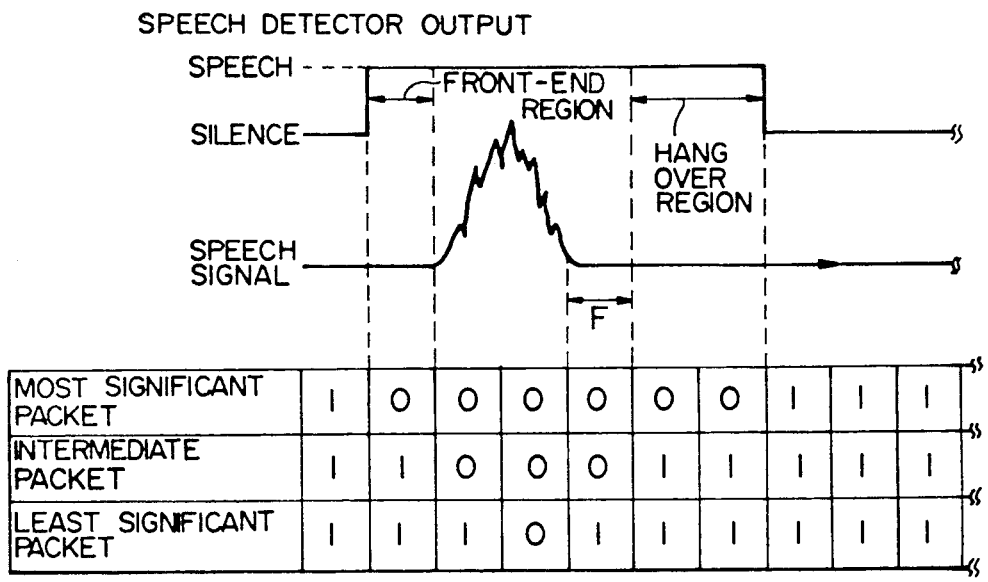
FIG. 22 illustrates the relationship in correspondence between input speech signal and priority of a transmitted packet in the speech communication system wherein the encoded speech signal is divided into three (most, intermediate and least significant packets)
Figure 23:
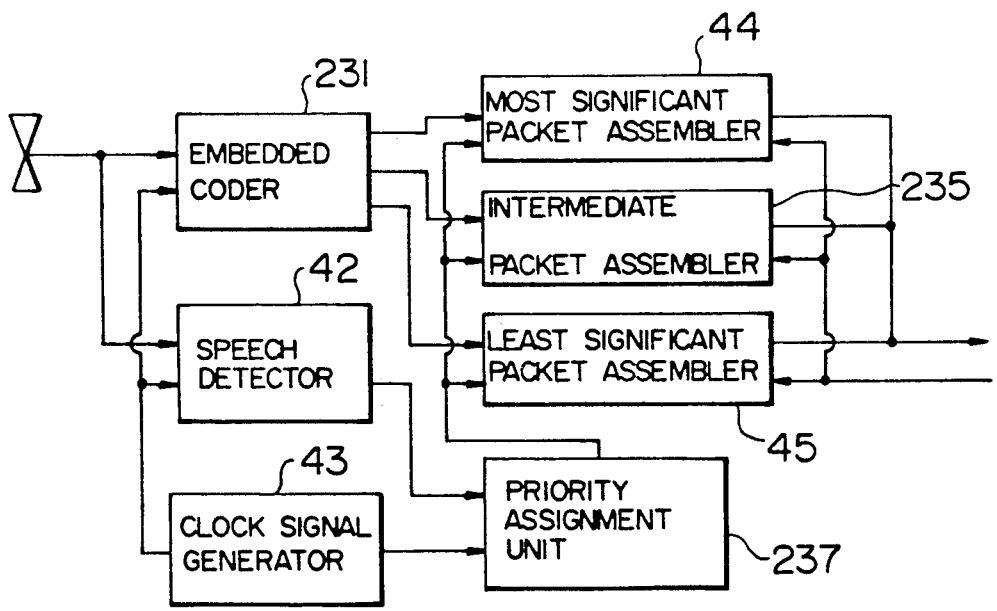
FIG. 23 is a block diagram of a transmitter (transmitter terminal) of a fifth embodiment of the speech communication system.

FIG. 22 illustrates the relationship in correspondence between three (most, intermediate, least significant) packets to which the encoded speech from the input speech signal is divided, and priorities of communication packets in the communication system to which the present invention is applied. FIG. 23 is a block diagram of a transmitter (transmitting terminal) in the communication system. The operation of the transmitter is similar to that of the above embodiments and further description thereof will be omitted.

As will be clear from the above description, according to the present invention, a higher priority is assigned to a packet obtained by division and assembly from a speech signal in a specific interval and which is greatly deteriorated due to dropout, and a lower priority to a packet less deteriorated depending upon the kind of the speech signal to thereby prevent a deterioration in the speech quality even if dropout of speech packets may occur due to switching transmission.

If overload occurs in the packet communication network, speech packets of lower priority are prevented from transmission to thereby minimize a deterioration in the speech quality and hence to avoid the overload.

By changing the process for assigning priorities to the speech packets depending on the specific call sequence input, one of high-quality speech communication and economical speech communication can be selected according to application.

Figure 24:
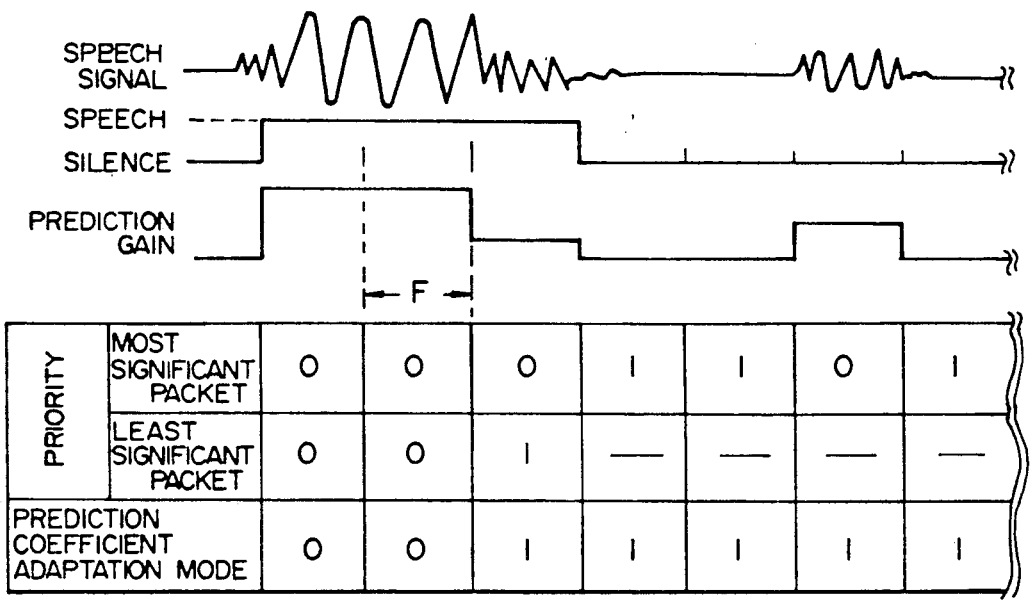
FIG. 24 illustrates the relationship in correspondence between speech signal inputted to a transmitter (speech terminal) in a sixth embodiment of the communication system, priorities of transmitted packets and prediction coefficient adaptation mode.

A sixth embodiment of the present invention in which the input speech signal is encoded using an Embedded ADPCM and in which the resulting signal is used to communicate with another operator will now be described. FIG. 24 illustrates the relationship among a speech signal input to the transmitter, priorities of transmitted packets and a prediction coefficient adaptation mode of differential encoding in a speech communication system which uses an Embedded ADPCM and to which the present invention is applied. A speech signal input at a predetermined sample period S is differentially encoded, stored in a packet at each predetermined frame period F, and transmitted to the receiver. At this time, the most and least significant bits of the differential code are prepared as separate packets, assigned predetermined priorities and transmitted.

A frame interval during which the input speech has power higher than a predetermined value is determined to be a speech and the most significant packet present during this period is assigned high priority. The priority of the least significant packet is determined in accordance with the prediction gain in this frame interval, namely, the ratio of the squared mean input speech signal to the squared mean differential signal. If the prediction gain is less than a predetermined threshold, the least significant packet is assigned low priority and transmitted. At this time, the mode is a first mode "1" in which the prediction coefficient is estimated using only the differential code contained in the most significant packet. If the prediction gain is above the predetermined threshold, the least significant packet is assigned high priority and transmitted. At this time, the mode is a second mode "0" which estimates the prediction coefficient using both the differential codes codes included in the most and least significant packets.

A frame having the power of the input speech lower than a predetermined value is determined to be silent and only the most significant packet is transmitted. At this time, a packet of a frame having a prediction gain higher than the predetermined value is assigned high priority while a frame having a prediction gain lower than the predetermined value is assigned low priority. The estimation of the prediction coefficient is performed in the first mode.

Figure 25A:
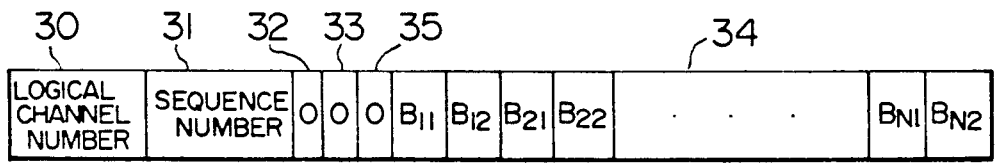
FIGS. 25A–25D each are a schematic of a packet in a respective mode.
Figure 25B:
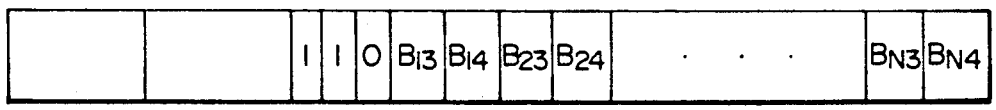
Figure 25C:
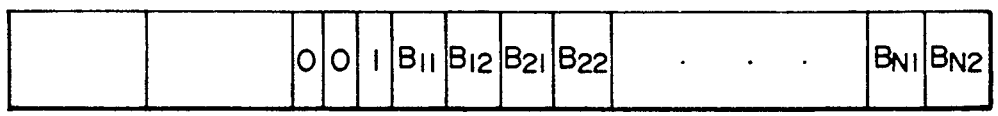
Figure 25D:
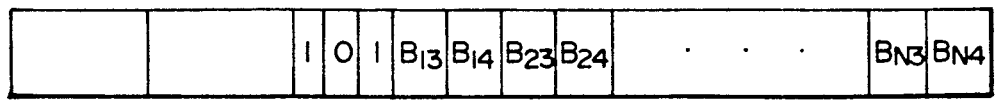

FIGS. 25A-25D each show the structure of a packet. Especially, FIGS. 25A and 25B illustrate the structures of the most and least significant packets taken when the prediction coefficient adaptation mode is the first mode. FIGS. 25C and 25D illustrate the most and least significant packets taken when the prediction coefficient adaptation mode is the second mode.

Each packet includes logical channel number 30 indicative of transit nodes through which that packet passes to a target receiver, sequence number 31 which is a serial number given in the order of generation of packets, most-/least-significant packet indication bit 32 indicative of the kind (most-/least-significant) of a differential code contained in the packet, bit 33 indicative of the priority of packet transmission, bit 35 indicative of a prediction coefficient adaptation mode which indicates a mode used for adaptation of a prediction coefficient, and speech information 34.

Figure 26A:
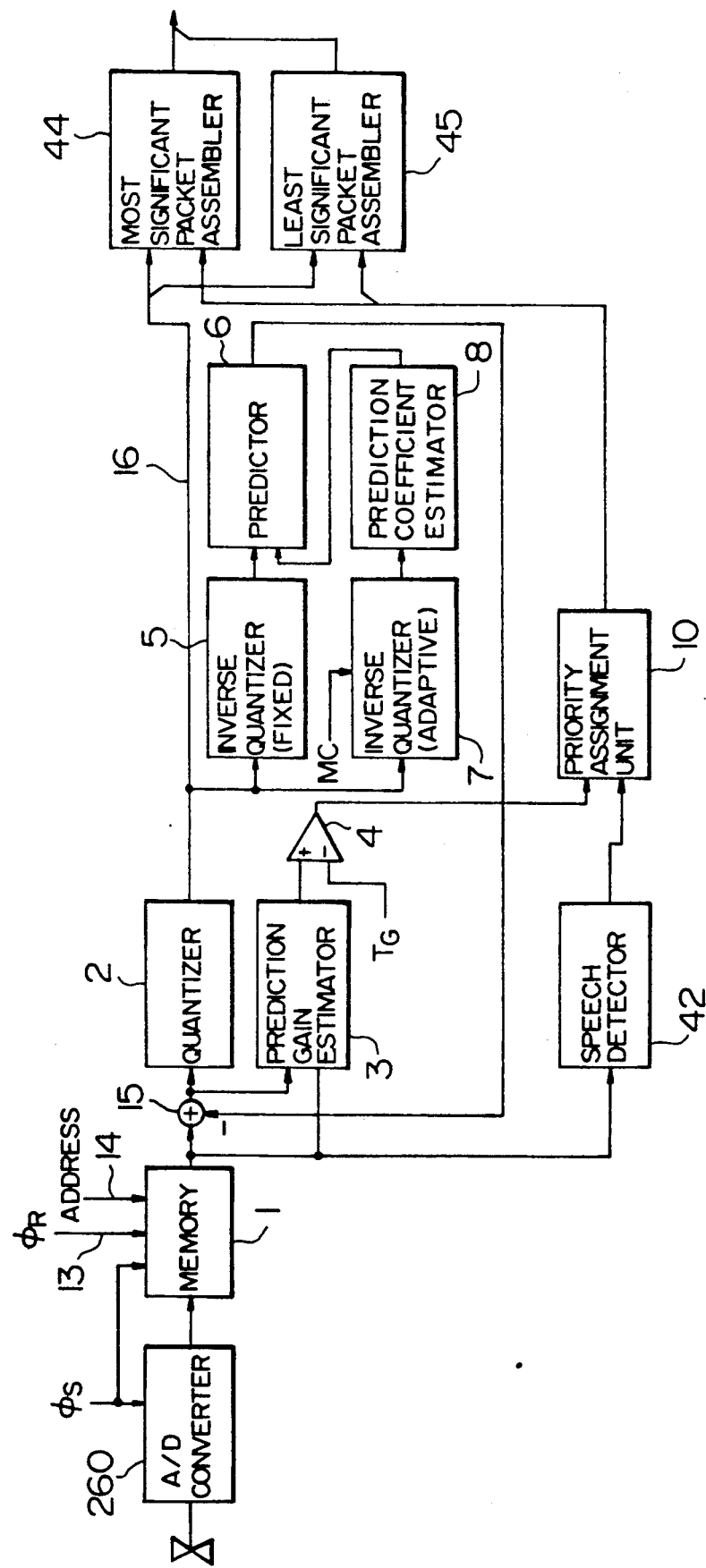
FIG. 26A is a block diagram of the transmitter in the sixth embodiment of the communication system.
Figure 26B:
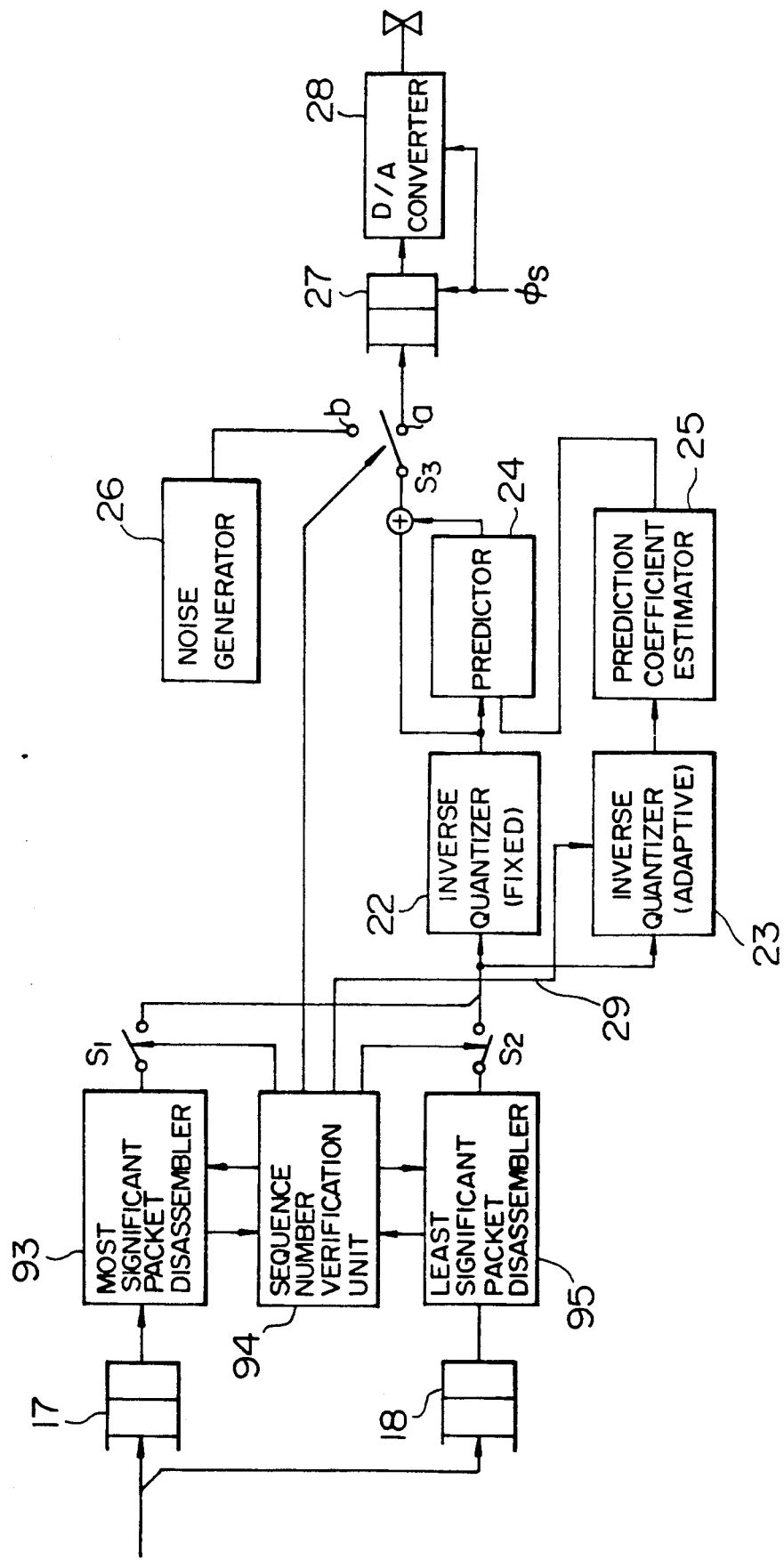
FIG. 26B is a block diagram of a receiver of the speech communication system as the sixth embodiment of the present invention.

FIG. 26A is a block diagram of a transmitter in a sixth embodiment of the speech communication system according to the present invention. FIG. 26B is a block diagram of a receiver of the embodiment. The transmitter converts the speech signal inputted at predetermined sample periods S to a digital signal and temporarily stores the resulting signal in memory 1 at predetermined frame periods F. The speech signal stored in memory 1 is sequentially read out with control signals 13 and 14, and differentially encoded by subtractor 15 and quantizer 2.

Subtractor 15 provides a differential signal indicative of the difference between the input speech signal and the output from predictor 6. The differential signal is converted by quantizer 2 to a differential code of a predetermined number of bits and output via signal line 16 to packet assemblers 44 and 45. The most significant bits of the differential code are output to most significant packet assembler 44 while the least significant bits are output to least significant packet assembler 45 to thereby form the most and least significant packets.

The differential code is also output to fixed precision inverse quantizer 5 which recovers the differential signal. Predictor 6 calculates a prediction signal using the differential signal and a prediction coefficient to be described later in more detail.

The differential code is also output to variable accuracy inverse quantizer 7 which recovers the differential code with an accuracy designated by a control signal (MC), namely, the differential signal with the designated predetermined most significant bits. The differential signal is recovered at the head of the frame, using MC=1, namely, the same number of bits (for example, 4 bits) as those from inverse quantizer 5. Prediction coefficient estimater 8 calculates a prediction coefficient input to the predictor 6 from the differential signal. The structure of predictor 6 and a process for calculating the prediction coefficient are described in detail, for example, in Proc. Globecom' 84 (1984) pp. 23.1.1-23.1.4, and further description thereof will be omitted.

FIG. 27 illustrates the structure of prediction gain estimater 3. The speech signal inputted at sample periods S and the differential signal are squared by multiplier 51, and integrated by integrater 52 to provide a squared integrated value at frame periods F. Divider 53 calculates a prediction gain which includes the ratio of the squared mean value of the speech signal to the squared mean value of the differential signal. After the prediction gain is calculated, integrater 52 is reset with a clock signal $\phi_F$ having a period of one frame.

Comparator 4 compares the prediction gain with a predetermined threshold $T_G$. If the gain is higher than threshold $T_G$, comparator 4 outputs "1" indicative of the second prediction coefficient adaptation mode while if the gain is lower than threshold $T_G$, the comparator outputs "0" indicative of the first prediction coefficient adaptation mode. This output is the control signal MC.

FIG. 28A illustrates the structure of variable accuracy inverse quantizer 7 (FIG. 26A) which includes a ROM receiving as address inputs inverse quantizing mode control signal MC and the differential code. FIG. 28B illustrates the characteristic of inverse quantizer 7. For simplicity, herein, the input differential code is assumed to be 2 bits. If control signal MC=0, quantizer 7 outputs a demodulated differential signal at one of two levels while if the control signal MC=1, the quantizer outputs a demodulated differential signal at one of four levels. In fixed accuracy inverse quantizer 5, MC is fixed to 1.

The prediction gain is calculated when encoding is effected with MC=1. If the prediction gain exceeds a threshold, the output of comparator 4 (hereinafter referred to as a prediction gain flag) is "1". If the prediction gain does not exceed the threshold, the prediction gain flag is "0", so that MC=0, namely, the accuracy of the variable inverse quantizer is reduced and encoding is effected again from the head of a frame to thereby output a differential code again.

Most- and least-significant packet assemblers 44 and 45 are controlled with a clock synchronous with control signal MC. If the prediction gain does not exceed the threshold, the signal encoded with MC=1 is discarded and the speech signal encoded with MC=0 is transmitted.

The prediction gain flag (control signal MC) is also delivered to priority assignment unit 10, the function of which is shown in FIG. 29A. Priority assignment unit 10 includes a table ROM which receives as its address inputs the prediction gain flag and the output of the speech detector (speech/silence flag) to determine whether the input speech signal for one frame contains a speech signal. The output of priority assignment unit 10 provides the priorities for the most and least significant packets. FIG. 29B illustrates the characteristic of priority assignment unit 10. The priority "0" indicates high priority while the priority "0" low priority, and "—" indicates that no packets are transmitted. Packets of FIGS. 25A-25D are prepared from the differential codes and priorities thus obtained and output to the receiver.

FIG. 26B is a block diagram of the receiver. The received most and least significant packets are stored in most- and least-packet buffers 17 and 18, respectively. Packets are delivered one by one to packet deassemblers 93 and 95 from the packet buffers 17 and 18, respectively. In packet deassemblers 93 and 95, logical channel number 30, most-/least-significant indication bit 32 and priority indication bit 33 not required to be decoded are first extracted and discarded. Sequence number 31 is then extracted and sequence number verification unit 94 checks whether the sequence numbers of the most and least significant packets are in serial order or not If the numbers are in serial order both in the most and least significant packets, switches $S_1$ and $S_2$ are closed and $S_3$ is switched to side a. As a result, differential codes for one packet are read out from most- and least-significant packet deassemblers 93 and 95 and delivered to fixed and variable accuracy inverse quantizers 22 and 23, respectively. The accuracy of variable accuracy inverse quantizer 23 is designated with a bit 35 indicative of a prediction coefficient adaptation mode extracted from the received packet. The characteristics of inverse quantizers 22 and 23 are the same as those of the elements 5, 7 of the transmitter.

The variable accuracy inverse quantizer output is delivered to prediction coefficient estimator 25 which outputs a prediction coefficient. The output of the fixed accuracy inverse quantizer is delivered together with the prediction coefficient to predictor 24 which calculates a prediction signal. The characteristics cf predictor 24 and prediction coefficient estimator 25 are of the same characteristic as those of the elements.

The prediction signal is then applied to the output of the fixed accuracy inverse quantizer to decode the speech signal and the resulting speech signal is stored in decoded speech buffer 27, from which a decoded speech signal is read out sample by sample in accordance with a sample clock $\Phi_s$, subjected to D/A conversion and delivered to the hand set.

If there is a dropout number in only the sequence numbers 31 of the least significant packet, switch $S_2$ is opened, $S_1$ is closed and $S_3$ is switched to side a if the prediction coefficient adaptation mode designating bit is "0". As a result, the speech signal is demodulated using only the differential codes of the most significant packet.

If there is a dropout number in only the sequence numbers 31 of the least significant packet and the prediction coefficient adaptation mode designating bit is "1", or if there is a dropout number in the most significant packet or both in the most and least significant packets, switches $S_1$, $S_2$ are together open and $S_3$ is switched to side b. At this time, the decoder does not work and, instead, noise generator 26 outputs a packet of noise simulating the speech signal.

According to the particular embodiment, if the calculation of the prediction coefficient is effected using the differential signal with reduced accuracy, so that the prediction gain is greatly reduced, and it is thus determined that the deterioration of the speech quality is large, the prediction coefficient estimation is effected using a high accuracy differential signal to enhance the prediction gain to thereby prevent a deterioration in the speech quality due to embedded encoding. At this time, a deterioration in the speech quality due to discarding is also suppressed by transmitting both the most and least significant packets with high priority. The reason for this is as follows. Since, generally, a speech of a large prediction gain corresponds to a speech or a vowel, an increase in the quantization noise due to discarding the least significant packet is large compared to silence or a portion of the speech signal corresponding to a consonant. This is because a silent speech signal contains noise components similar to quantization noise. By reducing the probability of occurrence of the least significant packet discard in the speech portion, an acoustic sense of noise is greatly reduced. While the particular embodiment has been illustrated in which only the predictor is adapted to the input signal, it may be applicable to a speech packet communication system in which the step width of a quantizer to be described later in more detail is adapted to the input signal.

A seventh embodiment will now be described in which the squared mean value of the differential signal is used as a criterion for determining the prediction coefficient adaptation mode. The particular embodiment is realized by replacing the prediction gain estimator 3 (FIG. 26A) of the sixth embodiment with squared mean estimator 38 for the differential signal shown in FIG. 30. In this case, only the differential signal is required as the input signal, and the speech signal is not.

The operation of the squared mean estimator will now be described. The differential signal input at predetermined sample periods S is squared by multiplier 54 and the resulting signal is integrated by integrator 52 at frame periods F. The resulting signal is delivered to comparator 4 and integrator 52 is then reset with a clock signal $\Phi_F$ of one frame period.

If the squared mean value of the differential signal thus obtained exceeds a predetermined threshold, it is determined that the difference between the prediction value and the input speech is large, and prediction coefficient adaptation mode indication bit 35 (FIGS. 25A-25B) is set to "1". If otherwise, it is determined that the prediction value matches satisfactorily with the input speech, and that prediction coefficient adaptation mode indication bit 34 is "0". Thus, like the sixth embodiment, the speech signal is encoded and a packet is prepared and transmitted.

According to the present invention, like the sixth embodiment, a deterioration in the speech quality is prevented by embedded encoding, and a deterioration in the speech quality due to discard is prevented as well. Compared to the sixth embodiment, a quantity of calculation required for determining the prediction adaptation mode is reduced.

Figure 31A:
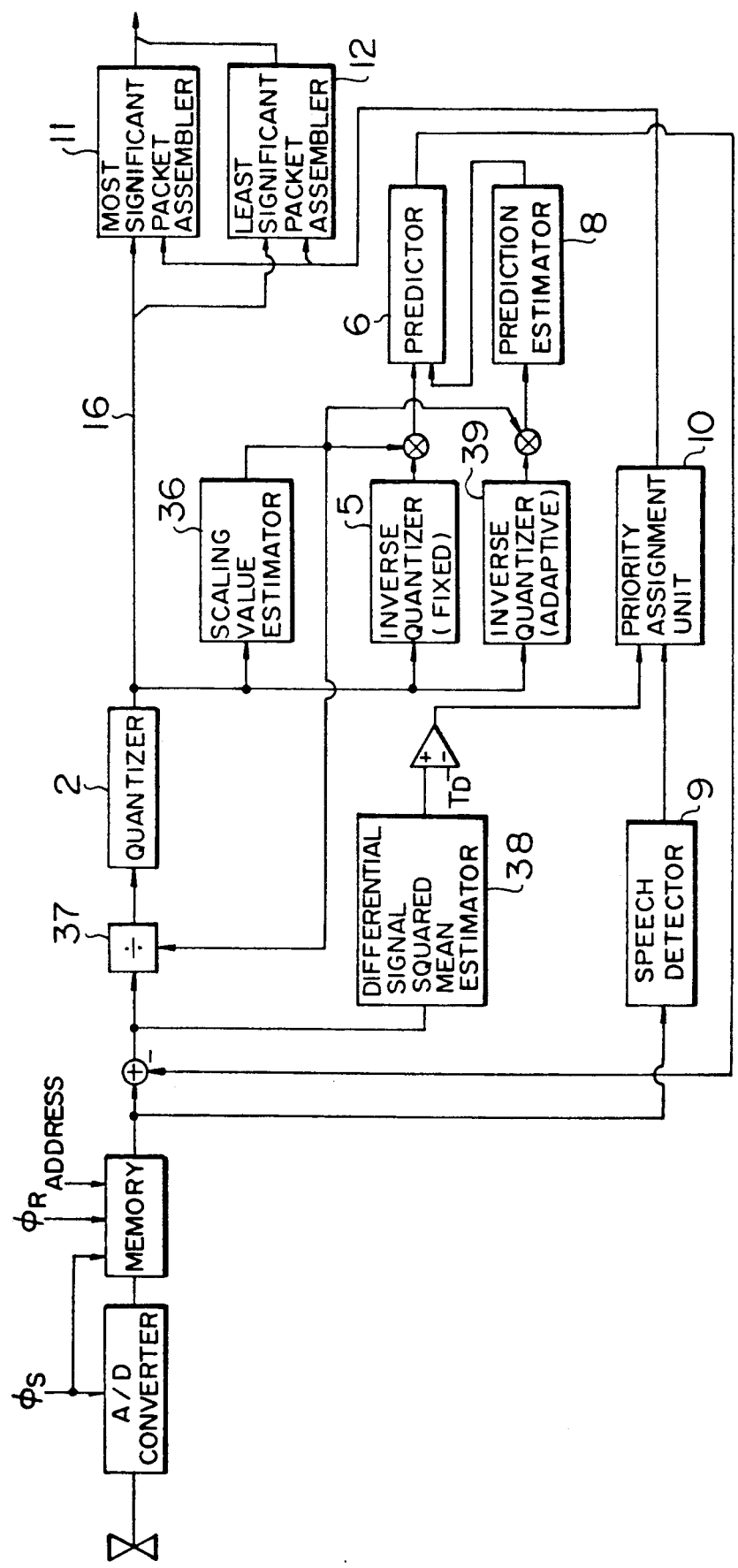
FIG. 31A is a block diagram of a transmitter of an eighth embodiment of the communication system.
Figure 31B:
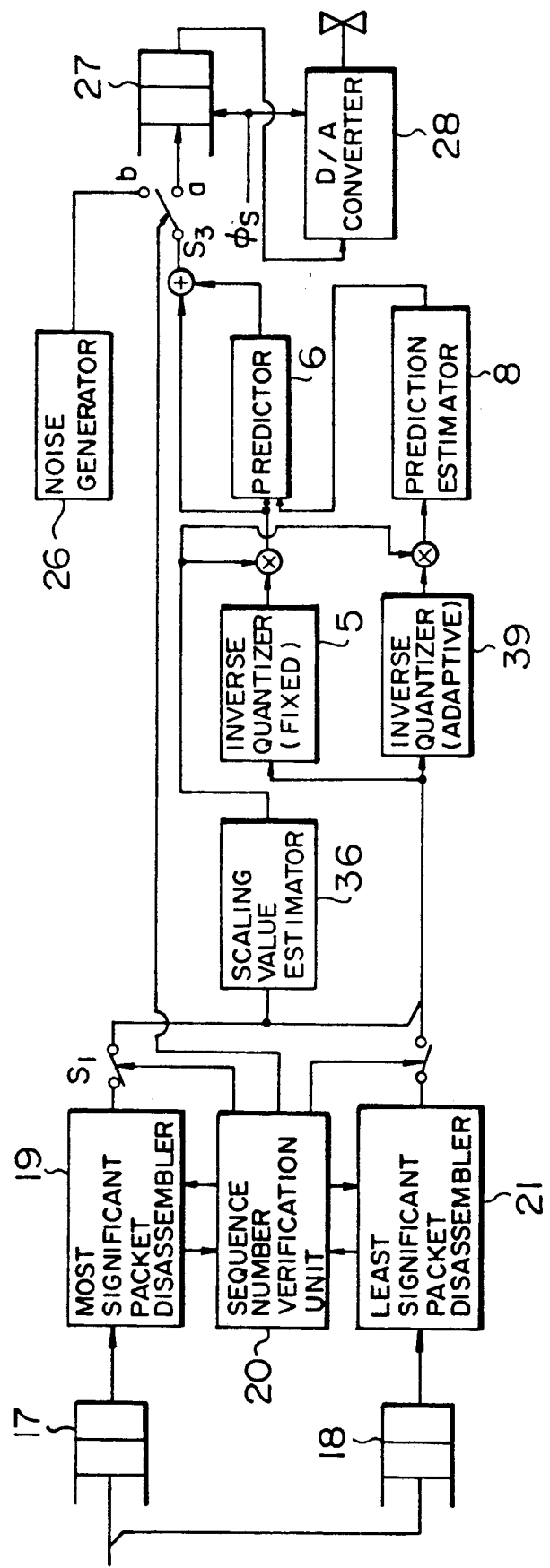
FIG. 31B is a block diagram of a receiver of the eighth embodiment.

An eighth embodiment will now be described in which the step width of the quantizer is adapted and the prediction coefficient adaptation mode indication bit is fixed to "0". FIG. 31A illustrates the structure of a transmitter of the eighth embodiment and FIG. 31B illustrates the structure of a receiver cf the eighth embodiment. The rough structure and operation of the particular embodiment is the same as those of the sixth embodiment except at the followings: in the particular embodiment, the dynamic range for the quantizer input is greatly reduced by subtracting the prediction value from the input waveform in the differential encoding to improve the quantization efficiency. If quantizers of the same number of bits are used, the quantizer employing quantization of the differential signal reduces the quantization error compared to the quantizer employing no such quantization. By adapting the step width of the quantizer to the dynamic range of the differential signal, the quantization efficiency is improved. To this end, the scaling value is determined from the magnitude of the differential code output on signal line 16, and it is divided prior to quantization and multiplied after inverse quantization to change the quantizing step width.

Figure 32:
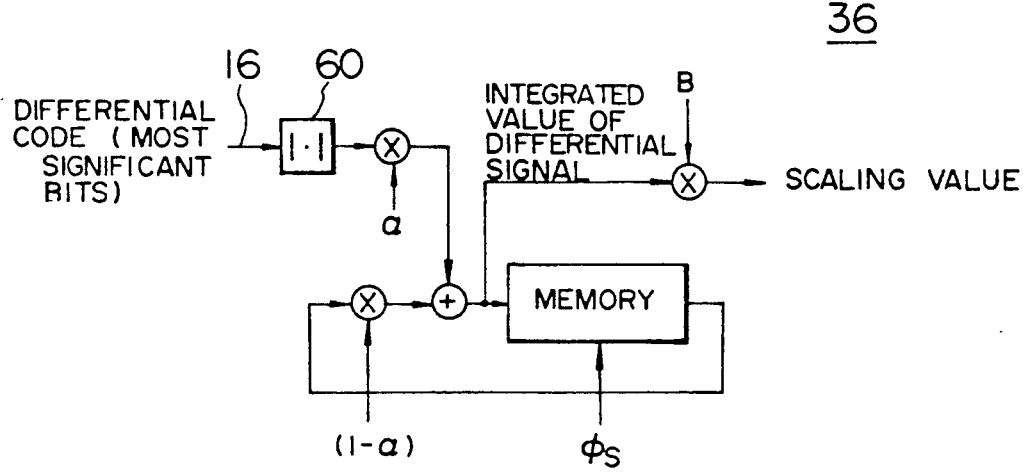
FIG. 32 is a block diagram of a scaling value estimator in the transmitter of the eighth embodiment.

FIG. 32 illustrates the structure of the scaling value estimator 36. First, the absolute value of the most significant bits of a differential signal is calculated by a positive number forming circuit 60 and multiplied by a predetermined factor of $\alpha$. The resulting value is added to $(1-\alpha)$ times the integrated differential signal value stored in the memory to thereby update the integrated value of the differential signal, the new integrated value of the differential signal is multiplied by a factor of 8 to provide a scaling value. The contents of the memory are updated at sample periods synchronously with a clock signal $\Phi_s$.

In the particular embodiment, the prediction coefficient adaptation mode indication bit 35 is fixed to "0". Inverse quantizer 5 which delivers a decoded differential signal to predictor 6 has the same characteristic as that of FIG. 28B where MC=1 is fixed. Inverse quantizer 39 which delivers a decoded differential signal to prediction coefficient estimator 8 has the same characteristic as that of FIG. 28B where MC=0 is fixed.

Figure 33:
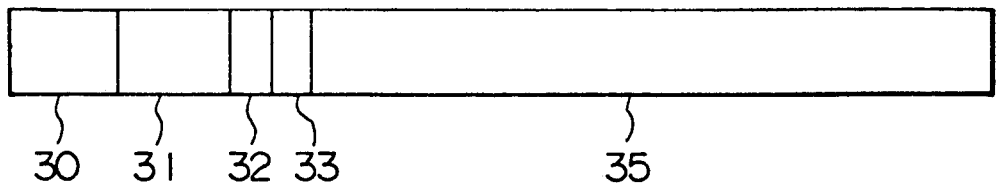
FIG. 33 shows the structure a packet in the eighth embodiment.

A speech signal is encoded using the quantizer and inverse quantizer having the above characteristics. Like the above embodiment, the most and least significant packets are prepared using the encoded differential codes. The respective packets are assigned priorities determined with speech/silence flag and the squared mean value of the differential signal as in the seventh embodiment. FIG. 33 illustrates the structure of a packet formed in the particular embodiment and which has the structure of FIGS. 25A-25D without prediction coefficient adaptation mode indication bit 35.

The receiver determines a scaling value from the received most significant differential code, and multiplies the scaling value by the inverse quantizer output to provide a decoded differential signal to recover the speech signal.

In the particular embodiment, the step width of the adaptive quantizer changes depending on the input thereto. If the quantizing step width is large, and the least significant packet is discarded, the quantizing error increases. In the particular embodiment, the least significant packet of the frame is assigned high priority to thereby reduce a probability of discard, and hence to suppress quantization noise and a deterioration in the speech quality.

While in the sixth - eighth embodiments every input speech signal has been described as being divided into the most and least significant bits in encoding, division of the encoded speech signal into two is the essential requirements of the present invention, and may be divided into any number of pieces.

A ninth embodiment will now be described in which a process for preparing a packet is selected in accordance with prediction coefficient adaptation mode. The structure and the operation of the particular embodiment except for the packet assembler are the same as those of the sixth embodiment and therefore only the packet assembler will be explained. FIG. 34 illustrates the relationship in correspondence among kinds of packets generated in accordance with prediction coefficient adaptation mode and speech/silence flag, and priorities assigned to the packets. Only when the prediction coefficient adaptation mode is "1" indicative of the adaptation of a prediction coefficient based on a high-accuracy decoded differential code, and the speech/silence flag is "1" indicative of a speech, a differential signal for one frame is divided into the former and latter halves, and packets are assembled, assigned high priorities and transmitted. Otherwise, the same packets as those in the sixth embodiment are prepared and transmitted.

FIG. 35A illustrates the structure of the former half packet assembled from the differential codes shown in FIG. 2. FIG. 35B illustrates the structure of the latter half packet. The most/least significant packet indicator 32 in the embodiment is used as the former/latter half indicator 61. All the most to least significant differential code bits for N/2 samples are stored in a single packet.

According to the particular embodiment, a deterioration in the speech quality due to embedded encoding is suppressed and a deterioration in the speech quality due to discard is also suppressed as in the sixth embodiment. Even if the prediction coefficient adaptation mode is "1" and any one of two high priority packets generated during one frame is discarded, the influence is suppressed within a half frame interval. The particular embodiment may be similarly applicable to the seventh and eighth embodiments. While in the particular embodiment the input speech signal has been described as being divided into the most and least significant bits or the former and latter halves in encoding, the division of the encoded speech signal into two is not the essential requirements of the present invention, and the encoded speech signal may be divided into any number of parts.

A tenth embodiment will now be described which has substantially the same structure as the sixth embodiment of FIG. 26A. The particular embodiment is implemented by employing the structure and process of FIGS. 36A and 36B which supply a threshold used for determination of the prediction coefficient adaptation mode.

Figures 36A, 36B:
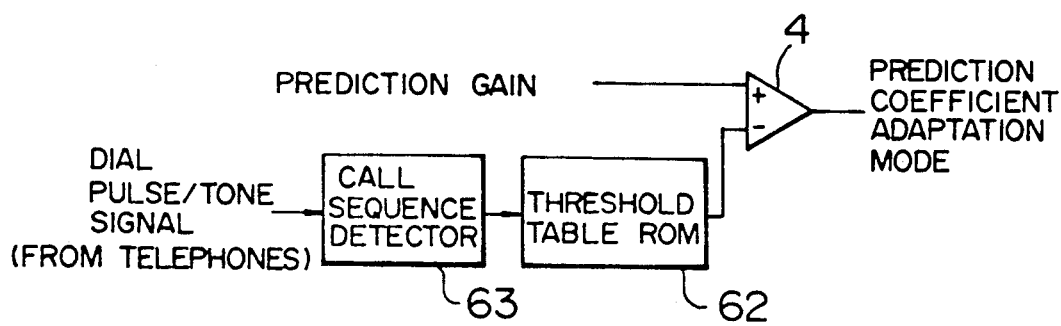
FIG. 36A is a block diagram of a prediction coefficient adaptation mode estimator of a transmitter in a tenth embodiment/of the communication system.
FIG. 36B illustrates the characteristic of a threshold RAM of the system.

The operation of the structure of FIG. 36A will now be described. A dial pulse/tone from by a telephone is input to call sequence detector 63. A plurality of call sequences determined beforehand in call setting are detected and the result of the detection is delivered to threshold ROM 42, which supplies to comparator 4 a prediction gain threshold determined in accordance with the detected number of the call sequence. FIG. 36B illustrates an illustrative characteristic in which as the detected number of the call sequence is smaller, the threshold is smaller. As the threshold is smaller, the prediction coefficient adaptation mode of even a frame in which the prediction gain is low is likely to be "1", and, as a result, the speech quality is improved. It is to be noted, however, that the number of high priority packets increases accordingly. The prediction coefficient adaptation mode of even a frame in which the prediction gain is higher as the threshold is larger is likely to be "0", and as a result the speech quality is deteriorated. The number of high priority packets also decreases accordingly. Generally, since a transmission delay and a discard rate are not ensured unless the number of high priority packets is limited below a predetermined value, the system is constructed such that the number of occurrence of high priority packets is reduced to a minimum required value in system design, and high charge rather than low charge is made for the transmission of high priority packets. Thus, according to the particular embodiment, by inputting a specific call sequence depending on application, an economical communication whose quality is more or less sacrificed, can be selected, for example, in intra-office communication while high quality communication can be selected for communication with external customers. While in the particular embodiment a specific call sequence is illustrated, a subscriber number which provides high quality speech communication may be discriminated from economical speech communication by changing the threshold according to subscriber number. While the particular embodiment is illustrated as being an adaptation of the sixth embodiment, it may be illustrated as an adaptation of the seventh to tenth embodiments.

As will be obvious from the above description, according to the present invention, even if the communication circuit between terminals is in high traffic state, high reproduced speech quality is obtained at the receiving end. Specifically, in the sixth to tenth embodiments, if the prediction coefficient is applied to the input speech using only part of the differential code when the speech signal for a particular interval is encoded differentially, the speech signal is encoded differentially by using a prediction coefficient which is adapted by the whole differential code if the degree of deterioration is large to thereby prevent a deterioration in the speech quality. For example, the signal to noise ratio of a frame whose prediction gain is 10 dB or more is improved by about 1.5 dB by encoding using a prediction coefficient adapted by all the differential codes.

At this time, if high priority is assigned to a packet containing a differential code used for adaptation of the predictor and low priority is assigned to other packets, a deterioration in the speech quality is prevented even if dropout of a speech packet occurs due to transmission. For example, like the above embodiment, if a frame whose prediction gain is 10 dB or more is assigned high priority and transmitted, the percent of high priority packets which occupy in all the packets generated increases by about 15%. Thus, when low priority packets are discarded by 10%, the signal to noise ratio is improved by about 3 dB.

If all packets generated for a specific interval have high priority, the process for preparing packets is changed to shorten an interval for which an adverse influence due to dropout of a packet is exerted.

A criterion for determining a prediction coefficient adaptation process using a specific call sequence input may be changed to select one of high quality speech communication and economical speech communication according to application.

We claim:

1. A speech packet communication system in which two speech terminal means communicate speech signal packets to each other through a transmission line connected therebetween, said transmission line includes at least one intermediate switching node for controlling traffic of packets passing through the transmission line based on priority indicators assembled in each of the packets, each of said speech terminal means comprising:

an encoder for converting an input speech signal to an encoded speech signal of a plurality of bits at a predetermined sample period;

a first packet assembler for preparing a first packet of the respective most significant bits of a plurality of encoded speech signals obtained in a frame interval of a plurality of sample period intervals, and for transmitting the first packet to the transmission line;

a second packet assembler for preparing a second packet of the respective least significant bits of the plurality of encoded speech signals obtained in the frame interval and for transmitting the second packet to the transmission line;

a speech detector for detecting a first parameter indicative of whether each of the encoded speech signals encoded during the frame interval belongs to an active speech region or a silent region, and for detecting a second parameter indicative of whether each of the encoded speech signals encoded at said predetermined sample period belongs to a front-end region, a hangover region of another region if the encoded speech signal belongs to an active speech region; and a priority assignment unit for determining first and second priority indicators to be assembled into first and second packets respectively in accordance with the first and second parameters detected by the speech detector, wherein the first packet assembler assembles the first priority indicator into the first packet while the second packet assembler assembles the second priority indicator into the second packet.

2. A speech packet communication system according to claim 1, wherein each speech terminal further comprises:

means for detecting speech power of the speech signal input during the frame interval, and wherein said priority assignment unit uses as a third parameter said speech power for determining the priority indicators.

3. A speech packet communication system according to claim 1, wherein said priority assignment unit comprises:

at least two kinds of tables indicative of a relationship in correspondence between said first and second parameters and first and second priority indicators and means for selecting one of the tables in accordance with a command from an operator and determining the priority indicators by referring to one of the tables.

4. A speech packet communication system according to claim 1, wherein said intermediate switching node connected to said speech terminal means via said transmission line includes means for detecting the number of packets output by said speech terminal means and means for controlling the number of packets output by said speech terminal means in accordance with the detected number of packets.

5. A speech packet communication system according to claim 1, wherein the transmission line further includes control means for detecting traffic of the intermediate switching node and means for controlling the number of packets output by the speech terminal means.

6. A speech packet communication means according to claim 1, wherein the transmission line includes control means for detecting traffic of the intermediate switching node and means for controlling the number of packets output by the intermediate switching node.

7. A speech packet communication system according to claim 1, wherein when the second priority indicator determined by the priority assignment unit is lower than a predetermined priority level, the second packet assembler stops to prepare the second packet which is to be assembled with the second priority indicator.

8. Speech packet communication system in which two speech terminal means communicate speech signal packets to each other through a transmission line connected therebetween, said transmission line includes at least one intermediate switching node for controlling traffic of packets passing through the transmission line based on priority indicators assembled in each of the packets, each of said speech terminal means comprising:

an encoder for converting an input speech signal to an encoded speech signal of a plurality of bits at a predetermined sample period;

a first packet assembler for preparing a first packet of bits indicative of characteristic portions of respective speech signals of a plurality of encoded speech signals obtained in a frame interval of a plurality of sample period intervals and for transmitting the first packet to the transmission line;

a second packet assembler for preparing a second packet of bits indicative of concomitant portions of the respective speech signals of the plurality of encoded speech signals obtained in the frame interval and for transmitting the second packet to the transmission line; and a priority assignment unit for determining first and second priority indicators to be assembled into the first and second packets in accordance with the nature of the speech signal input during the frame interval;

wherein the first packet assembler assembles the first priority indicator into the first packet and wherein the second packet assembler assembles the second priority indicator into the second packet.

9. A speech packet communication system according to claim 8, wherein the speech terminal means comprises:

a speech detector for detecting a first parameter indicative of whether each of the encoded speech signals encoded during the frame interval belongs to an active speech region or a silence region and for detecting a second parameter indicative of whether each of the encoded speech signals encoded at said predetermined sample period belongs to a front-end region, a hangover region or another region, and wherein the assignment unit determines said priority indicators by using the first and second parameters as indicators of the nature of each of the speech signals.

10. A speech packet communication system according to claim 9, wherein the speech terminal means further comprises:

means for detecting a third parameter indicative of speech power of each of the encoded speech signals, and wherein the assignment unit determines the priority using the third parameter as an indicator of the nature of each of the encoded speech signals.

11. A speech packet communication system according to claim 8, wherein said assignment unit comprises:

at least two kinds of tables indicative of a relationship in correspondence between the nature of each of the input speech signals and priority indicators to be assembled into the first and second packets, and wherein one of the tables is selected in accordance with a command from an operator, and wherein the assignment unit determines the priority indicators by referring to one of the tables.

12. A speech packet communication system according to claim 8, wherein when the second priority indicator determined by the priority assignment unit is lower than a predetermined priority level, the second packet assembler stops to prepare the second packet which is to be assembled with the second priority indicator.

13. A speech transmitting terminal for preparing speech packets from an input speech signal being supplied thereto and for transmitting the speech packets to a receiving terminal via at least one intermediate switching node which controls traffic of the packets passing therethrough based on priority indicators assembled in each of the packets, comprising:

an encoder for converting an input speech to an encoded speech signal of a plurality of bits at a predetermined sample period;

a first packet assembler for preparing a first packet of bits, indicative of characteristic portions of respective speech signals of a plurality of encoded speech signals obtained in a frame interval of a plurality of sample period intervals and for transmitting the first packet to the intermediate switching node;

a second packet assembler for preparing a second packet of bits, indicative of concomitant portions of the speech signals, of the plurality of encoded speech signals obtained in the frame interval and for transmitting the second packet to the intermediate switching node; and a priority assignment unit for determining first and second priority indicators to be assembled into the first and second packets in accordance with the nature of the speech signal input during the frame interval, wherein the first packet assembler assembles the first priority indicator into the first packet and wherein the second packet assembler assembles the second priority indicator into the second packet.

14. A speech transmitting terminal according to claim 13, further comprising:

a speech detector for detecting a first parameter indicative of whether each of the encoded speech signals encoded during the frame interval belongs to an active speech region or a silence region and for detecting a second parameter indicative of whether each of the encoded speech signals encoded at said predetermined sample period belongs to a front-end region, a hangover region or another region, and wherein the assignment unit determines said priority indicators by using the first and second parameters as indicators of the nature of each of the speech signals.

15. A speech transmitting terminal according to claim 14, further comprising:

means for detecting a third parameter indicative of speech power of each of the encoded speech signals, and wherein the assignment unit determines the priority using the third parameter as an indicator of the nature of each of the encoded speech signals.

16. A speech transmitting terminal according to claim 13, wherein the assignment unit comprises:

at least two kinds of tables indicative of a relationship in correspondence between the nature of each of the encoded speech signals and priority indicators to be assembled into the first and second packets, and wherein one of the tables is selected in accordance with a command from an operator, and wherein the assignment unit determines the priority indicators by referring to one of the tables.

17. A speech transmitting terminal according to claim 13, wherein when the second priority indicator determined by the priority assignment unit is lower than a predetermined priority level, the second packet assembler stops to prepares the second packet which is to be assembled with the second priority indicator.

18. A speech packet communication system in which two speech terminal means communicate speech signal packets to each other through a transmission line connected therebetween, said transmission line includes at least one intermediate switching node for controlling traffic of packets passing through the transmission line based on a priority indicator assembled in each of the packets, each of said speech terminal means comprising:

a subtractor for determining a difference between first and second signals respectively received by first and second input lines connected thereto and outputting the difference as a differential signal, wherein one of the input lines receives an input speech signal;

an encoder for converting the differential signal to an encoded speech signal of bits;

control signal generating means for generating a mean level signal from said differential signal and for comparing said mean level signal and a predetermined threshold to generate a control signal;

prediction signal generating means for selecting between a first mode for preparing a prediction signal from the respective most significant bits of a plurality of encoded speech signals output from the encoder and a second mode for preparing a prediction signal from all the bits of the plurality of encoded speech signals in accordance with the control signal and outputting the prediction signal generated by the selected mode, wherein the prediction signal is supplied to the second input line of the subtractor as the second signal;

a first packet assembler for preparing a first packet from respective most significant bits of a plurality of encoded speech signals obtained in one frame interval and for transmitting the first packet to the transmission line; and a second packet assembler for preparing a second packet from respective least significant bits of the plurality of encoded speech signals obtained in the one frame interval and for transmitting the second packet to the transmission line; and an assignment unit for determining first and second priority indicators to be assembled into the first and second packets in accordance with the control signal and a signal indicative of whether the speech signal input in the one frame interval belongs to an active speech region or a silence region, wherein the first packet assembler assembles the first priority indicator into the first packet and wherein the second packet assembler assembles the second priority indicator into the second packet.

19. A speech packet communication system according to claim 18, wherein said control signal generating means comprises:

a prediction gain estimator which estimates the prediction gain from the ratio of the squared mean value of the input speech signal to the squared mean value of the differential signal.

20. A speech packet communication system according to claim 18, wherein the first and second packet assemblers discard in accordance with the control signal the first and second packets including the encoded speech signals prepared from the input speech signal and the prediction signal which is prepared in the first mode, and prepares a first and a second packet using an encoded speech signal prepared from the input speech signal and the prediction signal prepared in the second mode.

21. A speech packet communication system according to claim 18, wherein when the second priority indicator determined by the assignment unit is lower than a predetermined priority level, the second packet assembler stops to prepare the second packet which is to be assembled with the second priority indicator.

22. A speech transmitting terminal for preparing speech packets from an input speech signal being supplied thereto and transmitting the speech packets to a receiving terminal via at least one intermediate switching node which controls traffic of packets passing therethrough based on priority indicators assembled in each of the packets, comprising:

a subtractor for determining a difference between first and second signals respectively received by first and second input lines connected thereto and outputting the difference as a differential signal, wherein said first input line receives an input speech signal as said first signal;

an encoder for converting the differential signal to an encoded speech signal of bits;

control signal generating means for generating a mean level signal from said differential signal and for comparing the mean level signal and a predetermined threshold to generate a control signal;

prediction signal generating means for selecting between a first mode for generating a prediction signal from the respective most-significant bits of a plurality of encoded speech signals output from the encoder and a second mode for generating a prediction signal from all the bits of the plurality of encoded speech signals in accordance with the control signal and outputting the prediction signal generated by the selected mode, wherein the prediction signal is supplied to said second input line of the subtractor as said second signal;

a first packet assembler for preparing a first packet from respective most significant bits of a plurality of encoded speech signals obtained in one frame interval and for transmitting the first packet to the transmission line;

a second packet assembler for preparing a second packet from respective least significant bits of the plurality of encoded speech signals obtained in the one frame interval and for transmitting the second packet to the transmission line; and an assignment unit for determining first and second priority indicators to be assembled into the first and second packets in accordance with the control signal and a signal indicative of whether the speech signal input in the one frame interval belongs to an active speech region or a silence region, wherein the first packet assembler assembles the first priority indicator into the first packet and wherein the second packet assembler assembles the second priority indicator into the second packet.

23. A speech transmitting terminal according to claim 22, wherein said control signal generating means generates said control signal from said differential signal and said input speech signal.

24. A speech transmitting terminal according to claim 22, wherein the first and second packet assemblers discard in accordance with the control signal the first and second packets including the encoded speech signals prepared from the input speech signal and the prediction signal which is prepared in the first mode, and prepares a first and a second packet using an encoded speech signal prepared from the input speech signal and the prediction signal prepared in the second mode.

25. A speech transmitting terminal according to claim 22, wherein when the second priority indicator determined by the assignment unit is lower than a predetermined priority level, the second packet assembler stops to prepare the second packet which is to be assembled with the second priority indicator.

26. A speech packet communication system in which two speech terminal means communicate speech signal packets to each other through a transmission line connected therebetween, said transmission line includes at least one intermediate switching node for controlling traffic of packets passing through the transmission line based on priority indicators assembled in each of the packets, each of said speech terminal means comprising:

a subtractor for determining a difference between first and second signals respectively received by first and second input lines connected thereto and outputting the difference as a differential signal, wherein said first input line receives an input speech signal as said first signal;

an encoder for converting the differential signal to an encoded speech signal of bits;

control signal generating means for generating a mean level signal from the differential signal and for comparing the mean level signal and a predetermined threshold to generate a control signal;

prediction signal generating means for selecting between a first mode for generating a prediction signal from respective most significant bits of a plurality of encoded speech signals output from the encoder and a second mode for generating a prediction signal from all the bits of the plurality of encoded speech signals in accordance with the control signal and outputting the prediction signal generated by the selected mode, wherein the prediction signal is supplied to said second input line of said subtractor as said second signal;

a first packet assembler for preparing a first packet from respective most significant bits of a plurality of encoded speech signals obtained in one frame interval and for transmitting the first packet to the transmission lines;

a second packet assembler for preparing a second packet from respective least significant bits of the plurality of encoded speech signals obtained in the one frame interval and for transmitting the second packet to the transmission line; and an assignment unit for determining first and second priority indicators to be assembled into the first and second packets in accordance with the control signal and a parameter signal indicative of whether the speech signal input in the one frame interval belongs to an active speech region or a silence region, wherein the first packet assembler assembles the first priority indicator into the first packet, wherein the second packet assembler assembles the second priority indicator into the second packet and wherein the assignment unit selectively switches between a first mode for preparing respective packets from the most and least significant bits of a plurality of encoded speech signals obtained in the one frame interval and a second mode for preparing respective packets from bits of the former and latter halves of the one frame interval in accordance with the control signal and the parameter signal.

27. A speech packet communication system according to claim 26, wherein the control signal generating means comprises:

a prediction gain estimator which estimates the prediction gain from the ratio of the squared mean value of the input speech signal to the squared mean value of the differential signal.

28. A speech packet communication system according to claim 26, wherein when the second priority indicator determined by the assignment unit is lower than a predetermined priority level, the second packet assembler stops to prepare the second packet which is to be assembled with the second priority indicator.

* * * * *